United States Patent
Nakagawa et al.

(10) Patent No.: US 7,720,172 B2
(45) Date of Patent: May 18, 2010

(54) TRANSMITTING APPARATUS RECEIVING APPARATUS, RADIO COMMUNICATION METHOD AND RADIO COMMUNICATION SYSTEM

(75) Inventors: Yoichi Nakagawa, Ota-ku (JP); Masayuki Orihashi, Ichikawa (JP)

(73) Assignee: Panasonic Corp., Osaka (JP)

( * ) Notice: Subject to any disclaimer, the term of this patent is extended or adjusted under 35 U.S.C. 154(b) by 1491 days.

(21) Appl. No.: 10/520,028

(22) PCT Filed: Sep. 12, 2003

(86) PCT No.: PCT/JP03/11688

§ 371 (c)(1),
(2), (4) Date: Dec. 28, 2004

(87) PCT Pub. No.: WO2004/028031

PCT Pub. Date: Apr. 1, 2004

(65) Prior Publication Data

US 2006/0058061 A1     Mar. 16, 2006

(30) Foreign Application Priority Data

Sep. 19, 2002   (JP)   ............................. 2002-272534
Aug. 21, 2003   (JP)   ............................. 2003-297117

(51) Int. Cl.
*H04L 27/00* (2006.01)

(52) U.S. Cl. ........................ 375/295; 375/260; 375/316; 375/267; 455/553.1; 455/13.4; 455/522; 455/127.1

(58) Field of Classification Search ................. 375/260, 375/148, 219, 316, 267, 295; 455/553.1, 455/13.4, 522, 127.1
See application file for complete search history.

(56) References Cited

U.S. PATENT DOCUMENTS 5,361,276 A * 11/1994 Subramanian ............... 375/150
5,995,533 A    11/1999 Hassan et al.

(Continued)

FOREIGN PATENT DOCUMENTS

JP    2000-156892    6/2000

(Continued)

OTHER PUBLICATIONS

Munster M. et al., "Co-Channel Interference Suppression Assisted Adaptive OFDM in Interference Limited Environments"; Vehicular Technology Conference, 1999, VTC Netherlands Sep. 19-22, 1999, Piscataway, NJ, USA, IEEE, US, vol. 1, Sep. 19, 1999), pp. 284-288 XP010352955, ISBN: 0-7803-5435-4.

(Continued)

*Primary Examiner*—Mohammad H Ghayour
*Assistant Examiner*—Leila Malek
(74) *Attorney, Agent, or Firm*—RatnerPrestia

(57) ABSTRACT

A radio communication method for transmitting data to radio stations, wherein propagation parameters to be estimated in a receiving station are controlled, based on the data transmitting, by an array antenna comprising a plurality of antenna elements to perform data transmitting in a transmitting station. This allows channels characterized by the propagation parameters to be shared only by particular radio stations, and signals are superimposed on the propagation parameters, thereby realizing radio access in which a high security is retained.

11 Claims, 23 Drawing Sheets

U.S. PATENT DOCUMENTS

| | | | |
|---|---|---|---|
| 6,373,832 B1 * | 4/2002 | Huang et al. | 370/342 |
| 6,424,678 B1 * | 7/2002 | Doberstein et al. | 375/260 |
| 6,760,388 B2 * | 7/2004 | Ketchum et al. | 375/295 |
| 6,834,043 B1 * | 12/2004 | Vook et al. | 370/310 |
| 6,876,645 B1 * | 4/2005 | Guey et al. | 370/342 |
| 2002/0067309 A1 * | 6/2002 | Baker et al. | 342/367 |
| 2002/0105907 A1 * | 8/2002 | Bruekers et al. | 370/229 |
| 2002/0111142 A1 | 8/2002 | Klimovitch | |
| 2002/0176485 A1 * | 11/2002 | Hudson | 375/144 |
| 2002/0193146 A1 * | 12/2002 | Wallace et al. | 455/562 |
| 2003/0053571 A1 * | 3/2003 | Belotserkovsky et al. | 375/350 |
| 2003/0185309 A1 * | 10/2003 | Pautler et al. | 375/257 |
| 2003/0185310 A1 * | 10/2003 | Ketchum et al. | 375/259 |

FOREIGN PATENT DOCUMENTS

| | | |
|---|---|---|
| JP | 2002-152191 | 5/2002 |
| JP | 2003-273856 | 9/2003 |

OTHER PUBLICATIONS

European Supplementary Search Report corresponding to Application No. PCT/JP03/11688 dated Feb. 20, 2006.

International Search Report corresponding to application No. PCT/JP03/11688 dated Dec. 24, 2003.

\* cited by examiner

Fig. 1A (Prior Art)
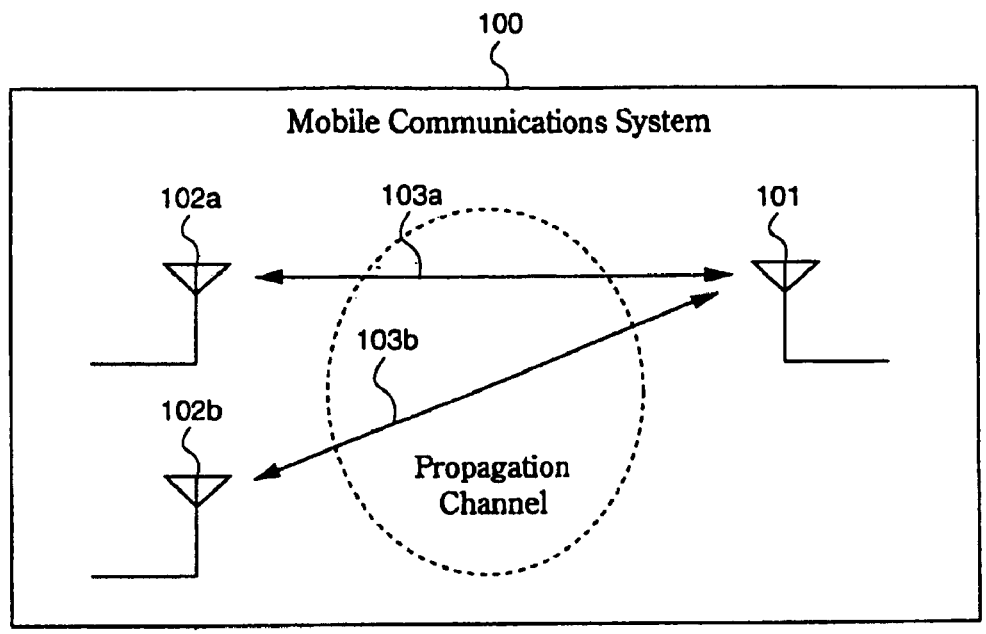
Fig. 1B (Prior Art)
Fig. 1C (Prior Art)
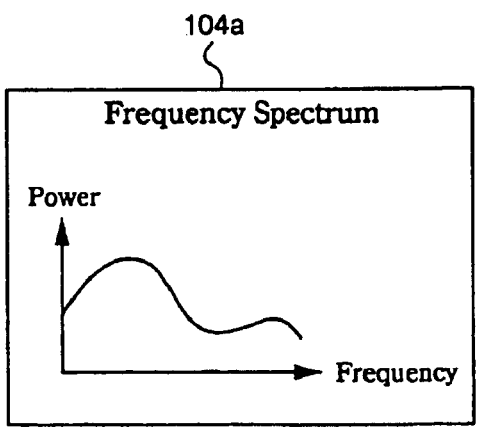
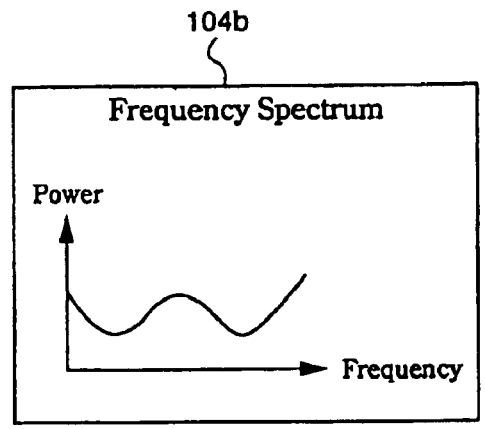

Fig.8A
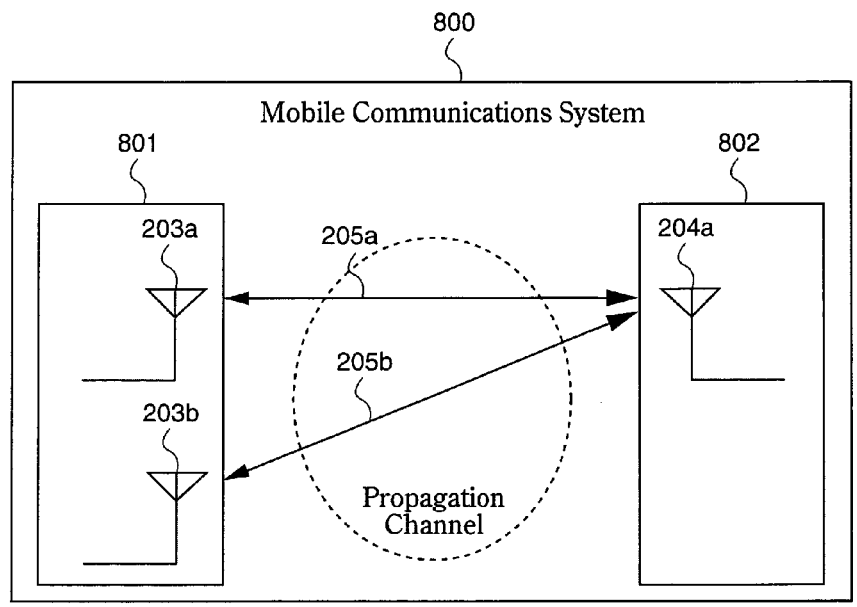
Fig.8B
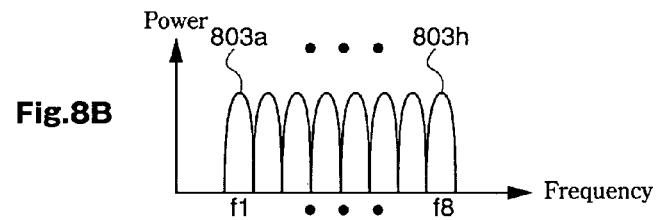
Fig.8C Fig.8D
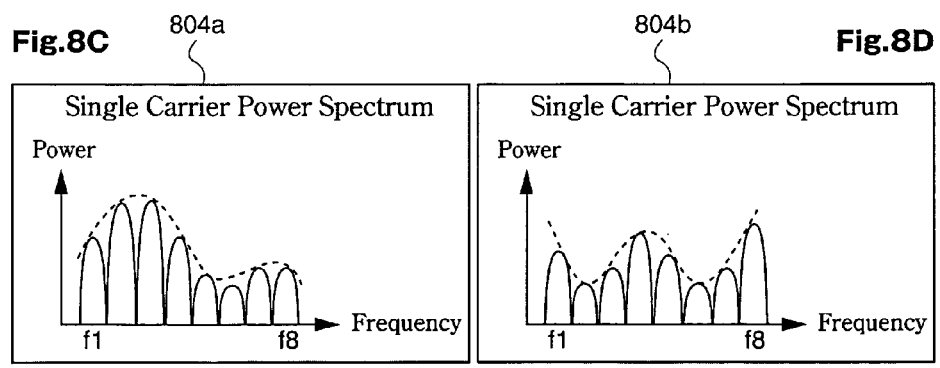

Fig. 18A

| Information to be Transmitted | Transmission Symbol Vector | |
|---|---|---|
| 1 | $\mathbf{V} \cdot \begin{bmatrix} 1 \\ 0 \end{bmatrix}$ | $\mathbf{V} \cdot \begin{bmatrix} 1 \\ 1 \end{bmatrix}$ |
| 0 | $\mathbf{V} \cdot \begin{bmatrix} 0 \\ 1 \end{bmatrix}$ | $\mathbf{V} \cdot \begin{bmatrix} 0 \\ 0 \end{bmatrix}$ |

Fig. 18B

| Information to be Transmitted | Transmission Symbol Vector | | | |
|---|---|---|---|---|
| 1 | $\mathbf{V} \cdot \begin{bmatrix} 1 \\ 0 \\ 0 \end{bmatrix}$ | $\mathbf{V} \cdot \begin{bmatrix} 1 \\ 1 \\ 0 \end{bmatrix}$ | $\mathbf{V} \cdot \begin{bmatrix} 1 \\ 0 \\ 1 \end{bmatrix}$ | $\mathbf{V} \cdot \begin{bmatrix} 1 \\ 1 \\ 1 \end{bmatrix}$ |
| 0 | $\mathbf{V} \cdot \begin{bmatrix} 0 \\ 1 \\ 1 \end{bmatrix}$ | $\mathbf{V} \cdot \begin{bmatrix} 0 \\ 0 \\ 1 \end{bmatrix}$ | $\mathbf{V} \cdot \begin{bmatrix} 0 \\ 1 \\ 0 \end{bmatrix}$ | $\mathbf{V} \cdot \begin{bmatrix} 0 \\ 0 \\ 0 \end{bmatrix}$ |

Fig. 19

| Information to be Transmitted | Transmission Symbol Vector |
|---|---|
| 10 | $\mathbf{H}^+ \cdot \begin{bmatrix} 1 \\ 0 \end{bmatrix}$ |
| 01 | $\mathbf{H}^+ \cdot \begin{bmatrix} 0 \\ 1 \end{bmatrix}$ |
| 11 | $\mathbf{H}^+ \cdot \begin{bmatrix} 1 \\ 1 \end{bmatrix}$ |
| 00 | $\mathbf{H}^+ \cdot \begin{bmatrix} 0 \\ 0 \end{bmatrix}$ |

TRANSMITTING APPARATUS RECEIVING APPARATUS, RADIO COMMUNICATION METHOD AND RADIO COMMUNICATION SYSTEM

This application is a U.S. National Phase application of PCT International Application PCT/JP03/11688.

TECHNICAL FIELD

The present invention relates to a transmitting apparatus, receiving apparatus, radio communication system and radio communication method for sending confidential information between particular radio stations.

BACKGROUND ART

Drastic improvements in transmission speed and transmission quality in recent years have led digital radio communications to occupy an important place in the communication field. On the other hand, since radio communications use radio space that is a public asset, there is a basic defect, that a third party may be able to receive, from the standpoint of confidentiality. Namely, there is always a constant risk of communication contents being intercepted by a third party and information leaked out.

Thus, in conventional radio communications, techniques such as encryption of confidential information are used to prevent a third party from understanding the contents of the hidden information even if transmitting data is intercepted by the third party. Encryption technique has been studied and applied in various fields. This is because encryption has the advantage of enabling constant security to be assured without changing a radio communication system.

However, through the process of information encryption, there is such a problem that information can be decrypted comparatively easily if the code and/or procedure for encryption are known. With the current state prevalent of high-speed computers, in particular, security can no longer be assured without performing rather complicated encryption processing.

Against such a problem accompanying the encryption technique, there is an invention disclosed in, for example, JP-A-2002152191 and so forth as a radio communication method that pays attention to a physical feature of the propagation environment thereof. FIG. 23 shows the conventional radio communication system as described in the publication.

In FIG. 23, a propagation environment estimator 2311 in a transmitting station 2310 estimates the state information of a radio propagation channel 2330 shared only between the transmitting station 2310 and a receiving station 2320 which is the destination of transmitting data including confidential information. Then the transmitting station 2310 transmits the data including confidential information in view of this radio propagation environment. Due to this, because other radio stations having different radio propagation path environments cannot receive or reconstruct confidential information, the transmitting station can transmit confidential information with a high security.

However, in a broadband radio communication in general, due to its enhanced transmission rate, propagation parameters characterizing the propagation path, directivity, and polarization of antennas come to have frequency characteristic. Consequently, such a radio communication method as disclosed in the patent publication, wherein the transmitting station controls the propagation parameters by using a plurality of antennas, is available on the premise that the propagation parameters should be controlled within a particular frequency band, that is to say, within the range where the frequency characteristic of the antennas and the propagation paths are deemed to be uniform.

What is the problem to be solved is that, in the case of a broadband radio communication, characteristics of propagation paths and antennas can not be effectively utilized enough.

DISCLOSURE OF THE INVENTION

The present invention addresses the problems discussed above, and aims to provide a transmitting apparatus, receiving apparatus, radio communication method and radio communication system with a highly-advanced security in which the characteristic itself of propagation parameters and antennas that have the frequency characteristic can be utilized as an information for identifying the transmitting signals in a broadband radio communication.

The transmitting apparatus according to the present invention comprises: an array antenna configured by M (M is an integer of 2 or more) pieces of antenna elements for receiving carrier modulation signals of a known symbol that is transmitting from a radio station; a reference symbol generation means for generating a reference symbol which is equal to the known symbol and which is to provide a phase reference; and a propagation channel estimation means for generating M pieces of receiving symbols, which are the estimate values for the complex propagation channels between the transmitting antenna and the array antennas, from the baseband signals received at the antenna elements based on the reference symbol, wherein the receiving symbols are estimate values for a complex propagation channel between a transmitting antenna and the array antenna.

Due to this configuration, in a complicated propagation environment for mobile communication, it is made possible to characterize the propagation channel characteristic shared only with the radio station that is the destination of transmitting data including confidential information, by a channel estimate value obtained by signals received at a plurality of antennas. That means the data including confidential information is transmitted based on the correlation for the channel estimates between antennas. Due to this other radio stations with different radio propagation environments cannot receive or reconstruct confidential information. As a result, confidential information can be transmitted with high security thanks to the feature of mobile communication, where relative physical relationship between transmission/reception devices is always changing.

Also, the transmitting apparatus according to the present invention, further comprises a carrier separation means for separating the received baseband signals received at M pieces of antenna elements into N (N is an integer of 2 or more) pieces of sub-carriers, wherein the carrier modulation signal is configured by multiple carriers, and the carrier separation means, after separating the received baseband signals into N (N is an integer of 2 or more) pieces of sub-carriers, generates "M×N" pieces of receiving symbols that are estimate values of the complex propagation channel based on the reference symbols.

Due to this configuration, in a complicated mobile communication propagation environment, the propagation channel characteristic, shared only with the radio station that is the destination of transmitting data including confidential information, can be characterized by channel estimate values that can be obtained from the receiving signals for each sub-carrier. As a result, this mechanism enables to transmit the amount of data equal to the maximum pieces of sub-carriers simultaneously in parallel, making it possible to transmit confidential information with high security in a short period.

Also, the propagation channel estimation means in the transmitting apparatus according to the present invention is, after applying a reverse spread separation process to the baseband signal received at the M (herein, M is an integer of 2 or more) pieces of antenna elements with N (N is an integer of 2 or more) pieces of spread codes, generates "M×N" pieces of receiving symbols that are estimate values of a complex propagation channel based on the reference symbol.

Due to this configuration, in a complicated mobile communication propagation environment, the propagation channel characteristic, shared only with the radio station that is the destination of transmitting data including confidential information, can be characterized by channel estimate values that can be obtained from the receiving signals for each spread code. As a result, this mechanism allows it to transmit the amount of data equal to the maximum pieces of spread codes simultaneously in parallel, making it possible to transmit confidential information with high security in a short period.

Also, M pieces of antenna elements configuring the array antenna in the transmitting apparatus according to the present invention have a mutually-different directional pattern, or a mutually-different polarization.

Due to this, the propagation channel characteristics shared only with the radio station that is the destination will vary depending on the directional patterns of the antenna elements configuring the array antenna. Therefore, in order to receive and reconstruct confidential information by other radio stations, it is necessary to consider the propagation channel characteristics including the antenna directional patterns. That means it is made more difficult for a third party to reconstruct confidential information, following that confidential information can be transmitted with high security. Further, if the number of the antenna elements is the same, the change of polarization can make it possible to downsize the array antenna as compared with the change of directional patterns, following that the whole apparatus can be downsized.

Also, the transmitting apparatus according to the present invention comprises a transmitting symbol calculation means that calculates a plurality of sets of transmitting symbol vectors from M pieces of receiving symbols so that each transmitting symbol vector is configured by M pieces of transmitting symbols and then generates a reference table configured by the plural sets of transmitting symbol vectors, a symbol mapping means that generates M pieces of transmitting symbols by selecting one of transmitting symbol vector from the reference table based on a transmitting data, and a single carrier modulation means that generates baseband signals from M pieces of transmitting symbols.

Also, the transmitting apparatus according to the present invention comprises a transmitting symbol calculation means that calculates a plurality of sets of transmitting symbol vectors from the "M×N" pieces of receiving symbols for each of N pieces of sub-carriers so that each vector is configured by M pieces of transmitting symbols; and then generate reference tables configured by the plural sets of transmitting symbols vector, a symbol mapping means for generating "M×N" pieces of transmitting symbols by selecting one set of transmitting symbol vector from each of N pieces of reference tables that correspond to the N pieces of sub-carriers based on transmitting data, and a single carrier modulation means for generating transmitting baseband signals from "M×N" pieces of transmitting symbols with N pieces of sub-carrier elements.

Due to this configuration, the propagation channel characteristics shared only with the radio station that is the destination of the transmitting data including confidential information can be characterized by the channel estimate values obtained from the receiving signals of a plurality of sub-carrier elements that configure multiple carriers over a plurality of antennas. By this means, the transmitting data including confidential information is transmitted depending on the correlation for the channel estimate values between antennas and so on. Namely, other radio stations with a different radio propagation environment cannot receive or reconstruct confidential information. As a result, in a mobile communication system, where the relative physical relationship between the transmitting/reception apparatus constantly changes and so does the frequency characteristic of the propagation channel accordingly, confidential information can be transmitted with even higher security.

Also, the transmitting apparatus according to the present invention comprises a transmitting symbol calculation means for calculating plural sets of transmitting symbol vectors from "M×N" pieces of the receiving symbols for each of N pieces of spread codes so that each transmitting symbol vector is configured by M pieces of transmitting symbols, and then generating reference tables configured by the plural sets of symbol vectors, a symbol mapping means for generating "M×N" pieces of transmitting symbols by selecting one set of transmitting symbol vector from each of the N pieces of reference tables based on the transmitting data including confidential information; and a single carrier modulation means for generating transmitting baseband signals from the "M×N" pieces of transmitting symbols by spread process with N pieces of reverse spread codes.

Due to this configuration, the propagation channel characteristic, which is shared only with the radio station that is the destination of transmitting data including confidential information, can be characterized by the channel estimate values estimated from the signals received at the a plurality of antennas depending on each of the a plurality of spread codes. By this, the transmitting data including confidential information is transmitted based on correlation for the channel estimate values between antennas. As a result, it is made impossible for other radio stations with a difference propagation environment to receive or reconstruct confidential information. Thus, thanks to the feature of mobile communication system where the relative physical relationship between transmitting/reception apparatus constantly changes and so does the propagation channel characteristic accordingly, it is able to utilize not only the confidentiality of spread codes but also the random characteristic of propagation parameters. As a result, it is made possible to assure even higher degree of security.

Also a transmitting symbol calculation means in the transmitting apparatus according to the present invention generates the plural sets of symbol vectors in order to control any one of the receiving power and the phase of the radio station.

Due to this configuration, because only receiving power has to be detected by the radio station, it is made possible for a wireless application to be very simply configured. As a result, the transmitting data with high security can be realized at low cost. Also, because the phase rotation of a receiving signal, which is caused in accordance with the move of a radio station in a multi-path propagation environment, is 360 degrees in length virtually equal to the wavelength of a carrier, it is made impossible for a third party to reconstruct the transmitting data including confidential information based on the phase information, especially by a mobile phone or wireless LAN having wavelength from dozens-cm to several-cm. As a result, confidential information can be transmitted with even higher degree of security as compared with the case of symbol determination using a receiving power.

The receiving apparatus according to the present invention comprises a propagation parameter estimation means for estimating propagation parameters from receiving signals and a symbol determination means for reconstructing the transmitting data based on the propagation parameters.

Also the receiving apparatus according to the present invention, further comprises a carrier separation means for separating the receiving signal, in which a receiving signal is configured by multiple carriers, into a plurality of sub-carriers, wherein the propagation parameter estimation means estimates a propagation parameter for each of the sub-carriers and the symbol determination means reconstructs the transmitting data from the receiving signal for each of the sub-carriers.

Also, the receiving apparatus according to the present invention has sub-carriers that are any one of an OFDM signal that is so configured as to be mutually-orthogonal in a frequency space and a CDMA signal that is so configured as to be mutually-orthogonal in a code space.

Also, the receiving apparatus according to the present invention comprises an array antenna that is configured by at least one antenna element, wherein the propagation parameter estimation means estimates the propagation parameter for each of the antenna.

Also, the receiving apparatus according to the present invention comprises a propagation parameter estimation means for generating a receiving symbol that is a complex symbol by applying orthogonal detection to a received baseband signal; and a symbol determination means for reconstructing the transmitting data from the receiving symbols based on predetermined criteria.

Due to this configuration, the data transmitting including confidential information is transmitted based on correlation for the channel estimates between antennas, which are the predetermined criteria. By this means can be made a symbol determination for receiving signals in the radio station, therefore other radio stations with a different propagation environment can not receive or reconstruct confidential information. As a result, thanks to the feature of mobile communication system where relative physical relationship between transmitting/reception apparatus constantly changes, confidential information can be transmitted with high security.

Also, the receiving apparatus according to the present invention, further comprises a carrier separation means for separating the baseband signal, which is configured by a multiple carriers, into N (N is an integer of 2 or more) pieces of sub-carrier elements, wherein the propagation parameter estimation means generates the receiving symbols for each of the sub-carriers after the carrier separation means separates the baseband signal into the sub-carriers.

Due to this configuration, the transmitting data including confidential information can be transmitted based on correlation for the channel estimates between antennas, which are the predetermined criteria. By this means can be made a symbol determination for receiving signals in the radio station, thus it is impossible for other radio stations with a different radio propagation environment to receive or reconstruct confidential information. As a result, thanks to the feature of mobile communication system where relative physical relationship between transmitting/reception apparatus constantly changes and so does the frequency characteristics of the propagation channel accordingly, it is made possible to transmit confidential information with even higher degree of security.

Also, a symbol determination means in the receiving apparatus according to the present invention reconstructs the transmitting data based on predetermined criteria after the propagation parameter estimation means applies a reverse spread process to the baseband signal with N (N is an integer of 2 or more) pieces of spread codes.

Due to this configuration, the transmitting data including confidential information is transmitted based on correlation for the channel estimates between antennas, which are predetermined criteria. By this means can be made a symbol determination for receiving signals by the radio station, thus it is impossible for other radio stations with a different radio propagation environment to receive or reconstruct confidential information. As a result of that, thanks to the feature of mobile communication system where relative physical relationship between transmitting/reception apparatus constantly changes and so does the characteristic of the propagation channel accordingly, it can utilize not only confidentiality of spread codes but also the random characteristic of propagation parameters. Therefore even higher degree of security can be assured.

Also, the symbol determination means of the receiving apparatus according to the present invention determines a symbol based on the receiving power of the antenna.

The radio communication method according to the present invention is the one of transmitting a data on a single carrier from the first radio station to a second radio station, comprising the steps of transmitting an information known by both radio stations from the second radio station to the first radio station, estimating a propagation parameter, which is a parameter of propagation channel shared only between the first radio station and the second radio station, based on the known information and the received information transmitted from the second radio station by the first radio station; transmitting the data from the first radio station to the second radio station by superimposing the transmitting data including a confidential information on the estimated propagation parameter, and calculating a plurality of propagation parameters that are obtained from receiving signals of a plurality of antennas in the second radio station; and reconstructing the transmitting data based on a plurality of propagation parameters calculated by the second radio station.

Due to this method, other radio stations having a different propagation channel with the first radio station can not reconstruct the above confidential information. This is because, in a multi-path propagation environment for mobile communications, there is shown a difference between the characteristics of propagation channels if observed at a different point. Namely, the propagation parameter that configures the propagation channel can become a particular information shared only between the first and the second radio stations. Further, the transmitting data is identified based on a plurality of propagation parameters obtained from the signals received at a plurality of antennas. Namely, the receiving signals in the particular antennas can be used as criteria for determining propagation parameters. That allows the modulation method to be more sophisticated, following that even higher degree of security is assured as a result.

Also, the radio communication method according to the present invention is the one of transmitting a data on a multiple carriers from the first radio station to the second radio station, comprising the steps of transmitting a information known by both radio stations from the second radio station to the first radio station, estimating the propagation parameter, which is a parameter of the propagation channel shared only between the first radio station and the second radio station, based on the known information and the received information transmitted from the second radio station by the first radio station, transmitting the data from the first radio station to the second radio station by superimposing the transmitting data on the estimated propagation parameter; calculating a plurality of propagation parameters obtained from receiving signals of a plurality of antennas in the second radio stations; and reconstructing the transmitting data based on the a plurality of propagation parameters calculated in the second radio station.

Also, in the radio communication method according to the present invention, the second radio station reconstructs transmitting data based on the propagation parameter estimated from the receiving signal for each carrier configuring the multiple carriers.

Also, in the radio communication method according to the present invention, each carrier configuring a multiple carriers is any one of OFDM signal that is so configured as to be mutually-orthogonal in a frequency space and a CDMA signal that is so configured as to be mutually-orthogonal in a code space.

The radio communication system according to the present invention is the one of transmitting a data by a single carrier modulation method from a first radio station to a second radio station. And the system has the first radio station that comprises a propagation channel estimation means for estimating the propagation channel parameter shared only between the first radio station and the second radio stations when the first radio station transmits a data including a confidential information to a second radio station; and a transmitting means for transmitting the data from the first radio station to the second radio station by superimposing the transmitting signal on the estimated propagation channel parameter, and the second radio station comprising a propagation parameter estimation means for calculating a plurality of propagation parameters obtained from receiving signals of a plurality of antennas and a symbol determination means for reconstructing a transmitting data from the first radio station based on a plurality of the calculated propagation parameters wherein the data transmitting from the first radio station to the second radio station includes confidential information.

As described above, the present invention can realize a transmitting apparatus, receiving apparatus, radio communication system and radio communication method that are capable of transmitting confidential information with high security.

BRIEF DESCRIPTION OF THE DRAWINGS

FIG. 1A is a figure showing a configuration of general mobile communication system.

FIGS. 1B and 1C are figures showing a frequency spectrum that configures a propagation channel between a transmitting antenna and a receiving antenna.

FIG. 8A is a block diagram showing a configuration of a radio communication system according to Embodiment 3 of the present invention.

FIG. 8B is a figure showing eight sub-carrier elements that configure a multiple carriers.

FIGS. 8C and 8D are figures showing a frequency spectrum that configures a propagation channel between a transmitting antenna and a receiving antenna.

FIGS. 18A and 18B are block diagrams showing a reference table of the transmitting station according to Embodiment 1 of the present invention.

FIG. 19 is a block diagram showing a reference table of the transmitting station according to Embodiment 2 of the present invention.

BEST MODE FOR CARRYING OUT THE INVENTION

Figure 2A:
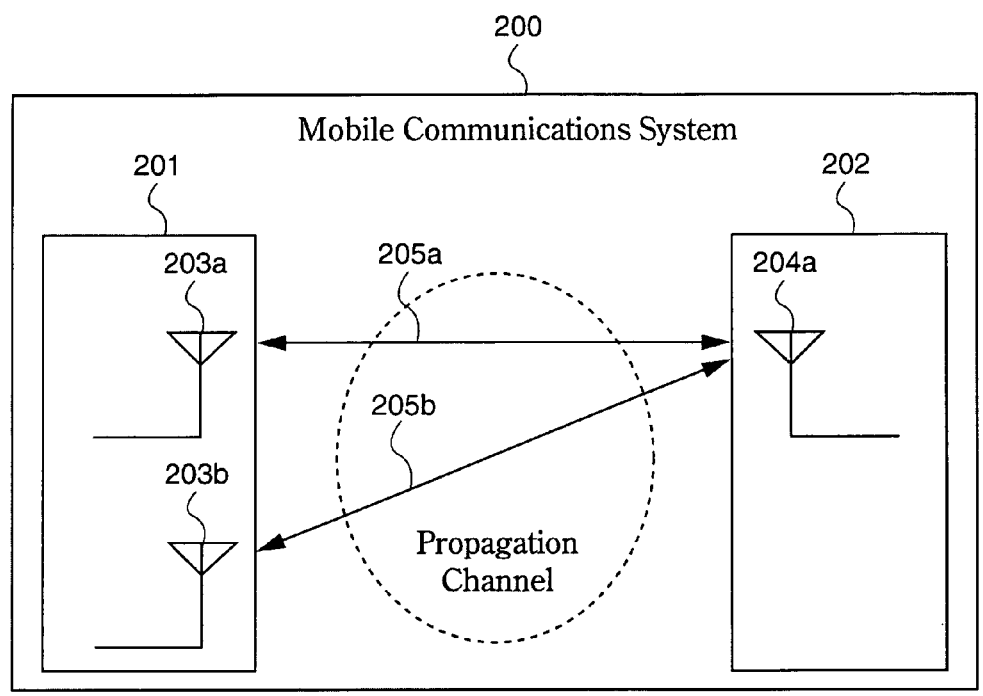
FIG. 2A is a block diagram showing a configuration of a radio communication system according to Embodiment 1 of the present invention.

Exemplary embodiments of the present invention are demonstrated in detail hereinafter with reference to the accompanying drawings.

Embodiment 1

FIG. 1A is a schematic diagram showing a general mobile communication system 100. FIGS. 1B and 1C show examples of a frequency spectrum, as one of examples of propagation parameters which configure the propagation channels between an transmitting antenna and two receiving antennas.

In FIG. 1A, the mobile communication system 100 comprises a transmitting antenna 101 and receiving antennas 102a and 102b, configuring a propagation channel 103a between the transmitting antenna 101 and the receiving antenna 102a and configuring a propagation channel 103b between the transmitting antenna 101 and the receiving antenna 102b. FIG. 1B shows a frequency spectrum 104a of receiving signals observed by the receiving antenna 102a. FIG. 1C shows a frequency spectrum 104b of receiving signals observed by the receiving antenna 102b.

Assuming a radio wave propagation environment of cellular phone, wireless LAN and so forth as a general mobile communication system 100, relative position between the transmitting/reception sides changes according to the move of terminals or peripheral objects. As a result, there is a variation occurred in the propagation channels 103a and 103b and that leads to the change of the frequency spectrums 104a and 104b.

This is because a plurality of arrival waves generated through what is called a multi-path propagation are synthesized in frequency-dependent amplitudes and phase differences. Therefore, when the propagation channel 103a varies, the frequency spectrum 104a also varies accordingly.

Meanwhile, in the case both antennas 102a and 102b receive simultaneously, there is a difference between the two receiving antennas in arrival waves, amplitudes and phase differences thereof depending on their antenna parameters and propagation parameters. Therefore, there is a difference occurred between the propagation channels 103a and 103b, following that the frequency spectrums 104a and 104b show a different characteristic each other.

Incidentally, in the present invention, "a propagation parameter" is defined to include: a complex channel coefficient which is expressed by amplitudes and phases of receiving signals against amplitudes and phases of reference signals including transmitting signals, from-station-signals and so on; radiation direction from a transmitting antenna; propagation time and propagation distance; incoming direction to a receiving antenna; an attenuation coefficient due to propagation; and further polarization for indicating the direction of electric field, all of which characteristics are dependent on the space propagation mechanism of radio waves. Further, it is defined that "antenna parameters" include all of design parameters such as directional pattern, polarization and matched impedance concerning general antenna designs.

Incidentally, in the case where the propagation channels on a same frequency do not vary due to time, the propagation path is allowed to keep its reciprocity between transmitting/reception. Therefore, even if the configuration of transmitting/reception in FIG. 1 is made reversed, characteristics of frequency spectrums 104a and 104b can be retained.

Details will be demonstrated hereinafter on the radio communication system where such a propagation channel characteristics in the mobile communication can be utilized by superimposing a signal to be transmitted on the propagation parameters.

FIG. 2A shows a radio communication system according to Embodiment 1 of the present invention.

In FIG. 2A, a radio communication system 200 includes a transmitting station 201 and a receiving station 202, performing a single-carrier radio communication in particular frequency bands. Here, as regards the transmitting station 201 and receiving station 202, the side that transmits confidential information is simply called the transmitting station 201, and the side that receives confidential information is simply called the receiving station 202, both of them having both of transmitting/reception functions each other.

Figure 2B:
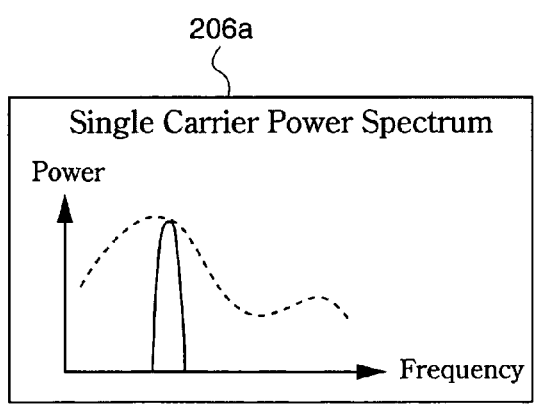
FIGS. 2B and 2C are figures showing a frequency spectrum that configure a propagation channel between a transmitting antenna and a receiving antenna.
Figure 2C:
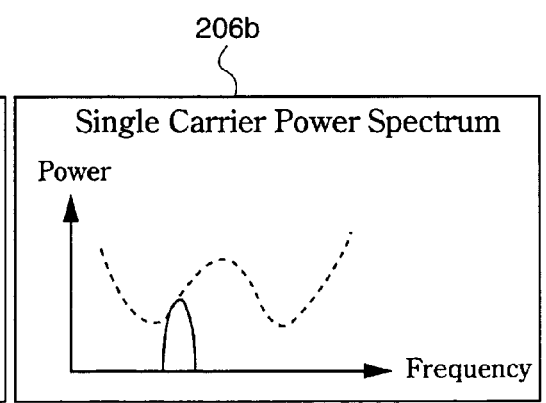

The transmitting station 201 includes a transmitting station antennas 203a and 203b, and the receiving station 202 includes a receiving station antenna 204a. FIG. 2B shows a single-carrier power spectrum 206a of a propagation channel 205a between the transmitting station antenna 203a and the receiving station antenna 204a. FIG. 2C shows a single-carrier power spectrum 206b of a propagation channel 205b between the transmitting station antenna 203b and the receiving station antenna 204a.

As described above, the power spectrums 206a and 206b have a different characteristic each other. Further, it is quite natural that other frequency spectrums such as estimated by other radio stations with a different propagation path will show different characteristics.

Figure 3:
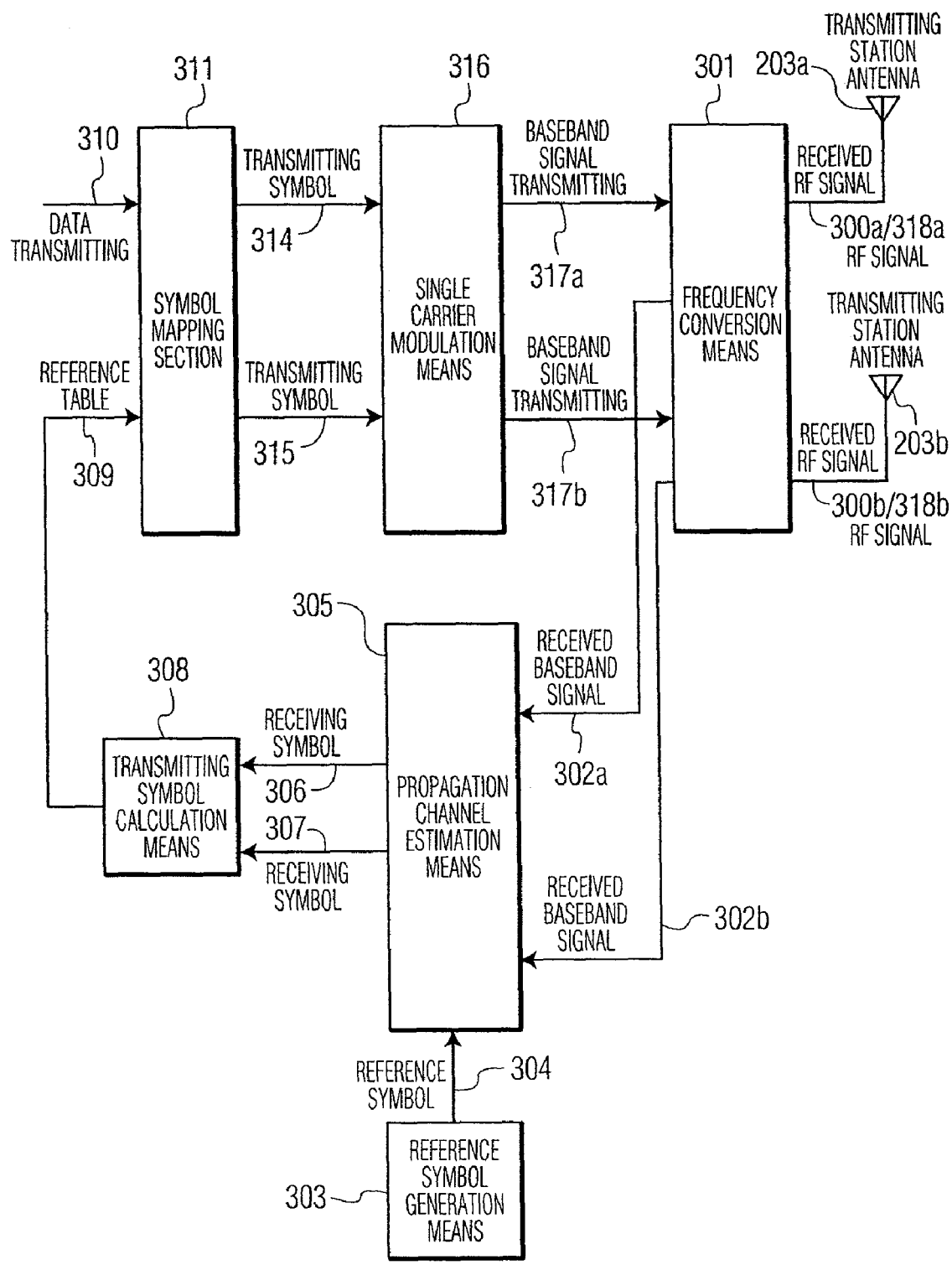
FIG. 3 is a block diagram showing a configuration of a transmitting station according to Embodiment 1 of the present invention.
Figure 4:
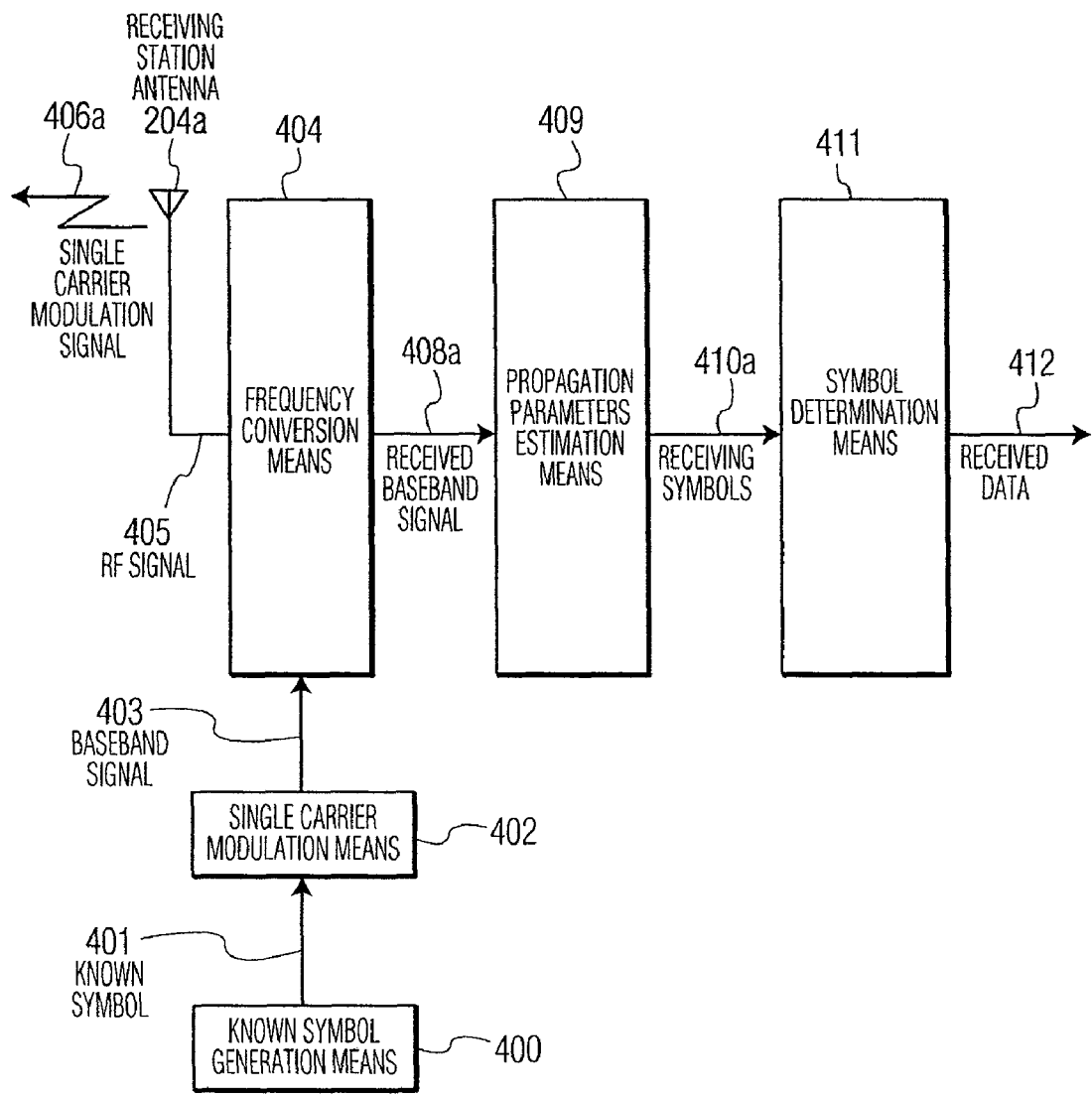
FIG. 4 is a block diagram showing a configuration of a receiving station according to Embodiment 1 of the present invention.

Next, FIG. 3 shows a particular configuration of the transmitting station 201 while FIG. 4 shows a particular configuration of the receiving station 202.

In FIG. 4, a known symbol generation means 400 generates a known symbol 401 that is shared between the transmitting station 201 and the receiving station 202. A single carrier modulation means 402 modulates the known symbol 401 to a baseband signal 403 to be transmitted. A frequency conversion means 404 modulates the baseband signal 403 to a RF signal 405 to be transmitted as well as modulates a RF signal that is received at the antenna 204a to a baseband signal 408a. Also, a propagation parameter estimation means 409 generates a receiving symbol 410a, which is a complex symbol, from the baseband signal 408a by orthogonal detection. A symbol determination means 411 performs a process of determining the receiving symbols 410a based on predetermined criteria. The antenna 204a transmits/sends out the RF signal 405 as a single carrier modulation signal 406a.

In FIG. 3, the transmitting antennas 203a and 203b receives/transmits RF signals. The frequency conversion means 301 converts received RF signals 300a and 300b into received baseband signals 302a and 302b respectively, while to convert transmitting baseband signals 317a and 317b into transmitting RF signals 318a and 318b.

Meanwhile, a reference symbol generation means 303 generates a reference symbol 304 that is equal to the known symbol 401 and that has a function to give a phase reference for the received baseband signals 302a and 302b. A propagation channel estimation means 305 accepts inputs of the received baseband signals 302a and 302b and generates receiving symbols 306 and 307 respectively based on the reference symbol 304, wherein the receiving symbol 306 is an estimate value for the complex propagation channel between the receiving station antenna 204a and the transmitting station antenna 203a while the receiving symbol 307 is an estimate value for the complex propagation channel between the receiving station antenna 204a and the transmitting station antenna 203b.

A transmitting symbol calculation means 308 inputs the receiving symbols 306 and 307, calculating a plurality of pairs of transmitting symbol vectors wherein each pair of vector is made of two transmitting symbols that correspond to the transmitting station antennas 203a and 203b respectively. And the calculated a plurality of pairs of transmitting symbol vectors configure a reference table 309. Hereinafter, details will be demonstrated on how to generate the transmitting vectors and reference table 309.

First, explanation is made on how to calculate a plurality of pairs of transmitting symbol vectors (each pair thereof is made of two transmitting symbols corresponding to the transmitting station antennas 203a and 203b respectively) for controlling the power of the receiving symbol 410a in the receiving station 202.

Herein, letting the receiving symbols 306 and 307 be denoted by h1 and h2 respectively, a channel matrix h that denotes the propagation characteristics between the transmitting station antennas 203a/203b and the receiving station antenna 204a is defined as in the following equation (1):

$$h = [h1\ h2] \quad (1)$$

Herein, letting the vector h be processed in Singular Value Decomposition, h can be given by the equation (2) as follows:

$$h = U \cdot \Lambda \cdot V \quad (2)$$

This is based on the fact that a random matrix can be reproduced as a product of three new matrixes by performing a Singular Value Decomposition process. In the case of the equation (2), let h be thought of as a one-row/two-columns matrix, U can be thought of as a one-row/one-column matrix. This case comes to '1'. Meanwhile, $\Lambda$ is a one-row/two-columns matrix, and V is a two-rows/two-columns matrix wherein v1 and v2, which are the column vector elements of V, are the particular vector of h. Those are respectively given by the following equations (3):

$$\Lambda = [s\ 0],\ V = [v1\ v2] \quad (3)$$

where s denotes a scalar and each of v1 and v2 is a two-rows/one-column vector.

Herein, suppose that v1 or v2 are the transmitting symbol vectors to be selected or multiplexed for transmitting depending on the data transmitting and that the transmitting station 201 transmits them from the transmitting station antenna 203a and 203b to the receiving station 202.

In cases where only v1 is transmitting or where v1 and v2 are vector-multiplexed and transmitting simultaneously, the receiving signal is given by the equation (4) as follows. The power of the receiving symbol 410a is virtually equal to $|s|^2$, where y denotes the receiving symbol 410a, n denotes some noise component mainly due to thermal noise from receiving devices, C1 denotes a symbol selection vector to be multiplied by V for selecting transmitting symbol vectors in this process.

$$y = h \cdot (V \cdot C1) + n = s + n, \quad C1 = \begin{bmatrix} 1 \\ 0 \end{bmatrix} \text{ or } \begin{bmatrix} 1 \\ 1 \end{bmatrix} \quad (4)$$

Similarly, in cases where only v2 is transmitting or where neither v1 nor v2 are transmitting, the receiving signal is given by mathematical formula (5) as follows, where the power of the receiving symbol 410a is nearly equal to zero. However, process is virtually similar except that C0 is substituted for C1 as a symbol selection vector.

$$y = h \cdot (V \cdot C0) + n = n, \quad C0 = \begin{bmatrix} 0 \\ 1 \end{bmatrix} \text{ or } \begin{bmatrix} 0 \\ 0 \end{bmatrix} \quad (5)$$

Based on the above, it will be possible to control the power of the receiving symbol 410a in the receiving station antenna 204a by calculating the transmitting symbol vector V·C with the symbol selection vector C (C1 or C0) and transmitting the transmitting symbol vector V·C as a transmitting symbol transmitting from the transmitting station antennas 203a and 203b.

For example, in a case where transmitting information is to be denoted by binary one-bit values, that is, '1' and '0', the transmitting station 201 is to select V·C1 when the transmitting information is '1', and select V·C0 when the transmitting information is '0' for transmitting. Due to this, it is made possible for the receiving station to determine the bit characteristic based on the power of the receiving symbol 410a.

Consequently the configuration of a reference table 309 generated by the transmitting symbol calculation means 308 is shown in FIG. 18A.

Incidentally, as for the case wherein the number of the transmitting station antennas is three, it can be processed similarly to the case of two antennas thereof just by considering the fact that the channel matrix h becomes one-row/three-columns (from one-row/two-columns). In this case, v1 and v2 will become a 3 dimensional vector. Further, in the reference table 309 as shown in FIG. 18B, there are increasing the set pattern for the symbol selection vector C in proportion to the increase in the number of antennas.

As described above, the transmitting symbol calculation means 308 is to calculate a plurality of pairs of complex symbols each symbol corresponding to the transmitting station antennas 203a and 203b respectively in order to control the power of the receiving symbol 410a in the receiving station 202, thus generating a reference table 309 that is made of the calculated transmitting symbol vectors.

A symbol mapping section 311 is to calculate the transmitting symbols 314 and 315 depending on the data transmitting 310 so that the power of the receiving symbol 410a will become equal to or more than the particular threshold value, or below. Now configuration and operation as for the symbol mapping section 311 will be demonstrated hereinafter.

Figure 5:
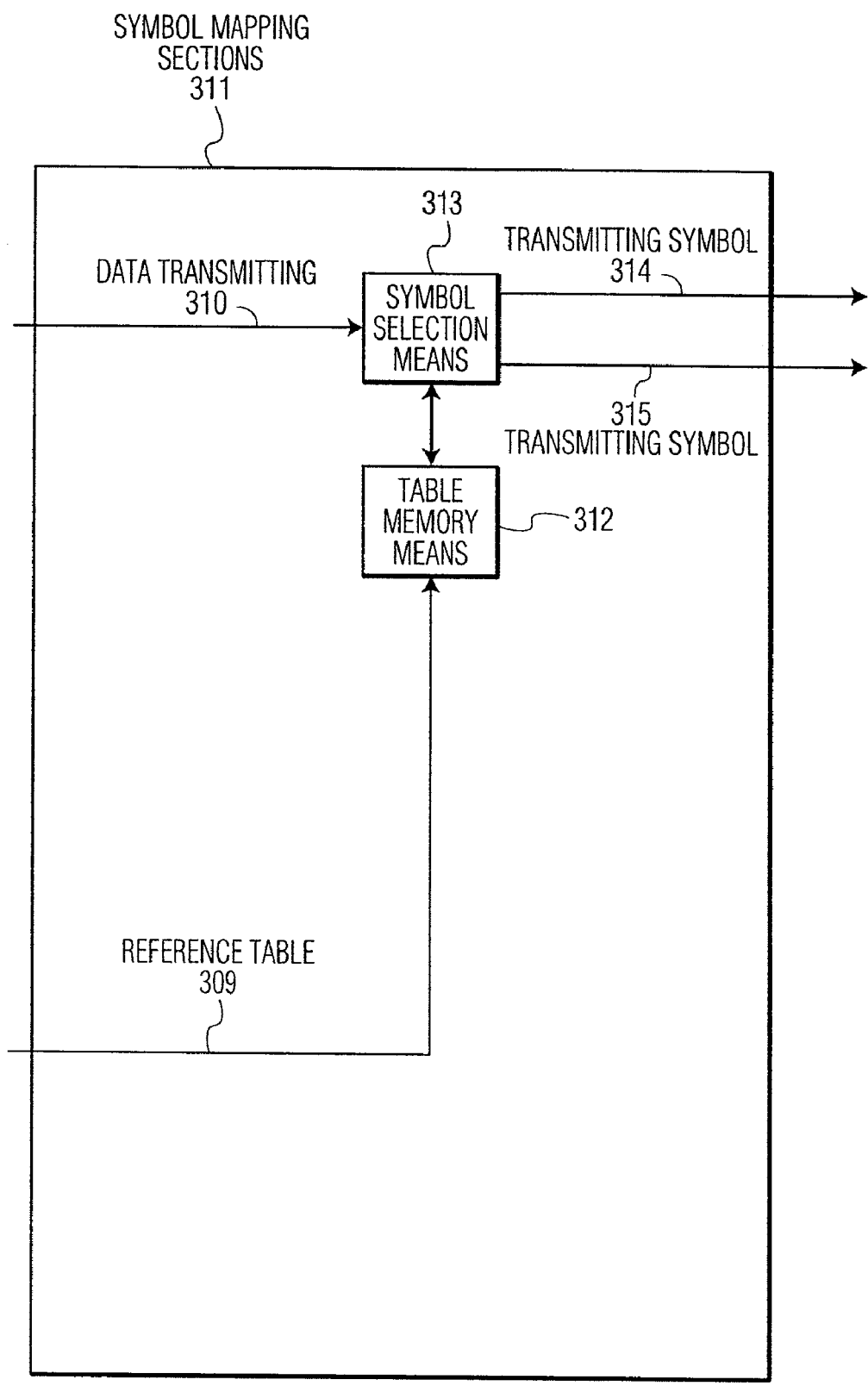
FIG. 5 is a block diagram showing a configuration of a symbol mapping section in the transmitting station according to Embodiment 1 of the present invention.

FIG. 5 is a block diagram showing a configuration of the symbol mapping section 311. As shown in FIG. 5, the symbol mapping section 311, recognizing the data transmitting 310 as input data, is configured by a table memory means 312 for storing the reference table 309 and a symbol selection means 313.

The symbol selection means 313 is to select the transmitting symbols 314 and 315 that correspond to the transmitting station antennas 203a and 203b respectively, by referring to the table memory means 312 depending on the data transmitting 310.

Next, a single carrier modulation means 316 is to generate baseband signals transmitting 317a and 317b by inputting the transmitting symbols 314 and 315 respectively.

In the following examples are made an explanation on the radio communication method performed between the transmitting station 201 and the receiving station 202 as configured above.

First, a known symbol 401, which is generated by the known symbol generation means 400 in the receiving station 202, is to be modulated to a baseband signal transmitting 403 by the single carrier modulation means 402.

Next, the modulated baseband signal transmitting 403 is to be converted into a RF signal transmitting 405 by the frequency conversion means 404, then being transmitting from the antenna 204a as a single carrier modulation signal 406a.

Next, this single carrier modulation signal 406a that is modulated from the known symbol 401 and transmitting from the receiving station 202 is to be received simultaneously at the antennas 203a and 203b in the transmitting station 201, then being converted into received baseband signals 302a and 302b respectively through the frequency conversion means 301.

Next, this baseband signals 302a and 302b are processed in the propagation channel estimation means 305 based on a reference symbol 304 that is generated by the reference symbol generation means 303. Due to this, there are generated receiving symbols 306 and 307, which denote the estimate values of complex propagation channels between the receiving station antenna 204a and each of the respective transmitting station antennas 203a and 203b.

Next, those receiving symbols 306 and 307 are processed in the transmitting symbol calculation means 308, calculating a transmitting symbol vector made of two elements corresponding to the transmitting station antenna 203a and 203b respectively. Consequently there is generated a reference table 309 configured by the a plurality of sets of those symbol vectors.

As described above, both of the transmitting station 201 and the receiving station 202 are to calculate the propagation parameters therebetween with the respective known symbols in advance, thus storing the calculated results as a reference table in the transmitting station 201.

Next, data transmitting 310 is worked out in the symbol mapping section 311 as a set of a transmitting symbols 314 and 315 with the aforementioned reference table, so that the power variation of the receiving symbol 410a in the receiving station 202 can be made equal to the data sequence of the data transmitting 310.

Next, the transmitting symbols 314 and 315 are processed in the single carrier modulation means 316 to generate baseband signals 317a and 317b transmitting.

Next, the baseband signals 317a and 317b transmitting are simultaneously converted into RF signals 318a and 318b transmitting through the frequency conversion means 301, then being transmitting respectively from the transmitting station antennas 203a and 203b to the receiving station 202.

Next, the RF signals 318a and 318b transmitting from the transmitting station 201 are synthesized at the receiving station antenna 204a and received, then being converted into a received baseband signal 408a through the frequency conversion means 404.

Next, this baseband signal 408a is processed in the propagation parameters estimation means 409 to generate a receiving symbol 410a by orthogonal detection.

Next, the receiving symbol 410a is determined in the symbol determination means 411 based on predetermined threshold value of the power, to obtain a received data 412.

In doing so as described above, the transmitting data 310 including confidential information that are transmitting from the transmitting station 201 are reconstructed.

In the following examples are described aforementioned operations in detail.

For example, suppose a case where the data transmitting 310 is a binary data sequence [10001101] and this data sequence is transmitting in time-series for transmitting 8 bits of information.

First, in the symbol mapping section 311 in the transmitting station 201, the symbol selection means 313 will, when the data transmitting 310 is '1' for example, select the set of transmitting symbols 314 and 315 from the table memory means 312 so that the power of the receiving symbol 410a in the receiving station 202 can be equal or above the particular threshold value. On the other hand, when the data transmitting 310 is '0', the symbol selection means 313 will select the set of transmitting symbols 314 and 315 from the table memory means 312 so that the power of the receiving symbol 410a can be less than the particular threshold value.

Next, the selected transmitting symbols will be modulated and then transmitting from the antennas 203a and 203b respectively.

Next, in the receiving station 202 that received the above, the symbol determination means 411 will, when the power of the receiving symbol 410a is equal or above the particular threshold, determine the received data as '1'; when the power of the receiving symbol 410a is less than the particular threshold, the symbol determination means 411 will determine the received data as '0'. Due to this, data will be demodulated. Then compare the demodulated sequence for the power of the receiving symbol 410a that was determined in time series with the transmitting data sequence [10001101]. If they correspond each other, now it is proved that the data has been appropriately transmitting.

Such controlling system can be available because, in a situation where the propagation parameter is stable, power and phase difference of arrival paths vary at the receiving antenna side in accordance with the change of directional pattern of the transmitting antenna, and power of the receiving signal also changes accordingly.

Namely, variation in amplitudes and phases of transmitting symbols 314 and 315 (which are complex symbols) will change the synthesized directional patterns generated by both of the transmitting station antennas 203a and 203b. As a result, the signal power of the receiving symbol 410a that are received at the receiving station antenna 204 will also change.

Further, power spectrums 206a and 206b, depending on the propagation space configured between the transmitting station and the receiving station, are thought to characterize the physical relationship between transmitting/receiving stations. Therefore it can be observed that the same transmitting signals from the same transmitting station 201 have a different frequency spectrum if received at a different receiving station other than the receiving station 202.

For this reason, in a radio communication system where demodulation of transmitting data 310 is made based on the power of the receiving signals under the above-described configuration, it is quite difficult for a third party to demodulate or reconstruct the transmitting data 310 including confidential information at another receiving station. Consequently it is possible to transmit confidential information with a high security.

In the above descriptions are demonstrated the way of modulation where symbol information of data transmitting is superimposed on the power (an amplitude) of a single carrier as the propagation parameter. However, it is also possible to superimpose the symbol information on a phase.

Namely, the transmitting symbol calculation means 308 can also be configured so as to generate such transmitting symbols for controlling the phase of the receiving symbol 410a in the receiving station 202, wherein each of the transmitting symbol 314 corresponding to the transmitting station antenna 203a and the transmitting symbol 315 corresponding to the transmitting station antenna 203b is a complex symbol.

Then, the propagation parameter estimation means 409 estimates the receiving symbol 410a as a complex symbol. Therefore, when the symbol determination means 411 uses a phase as a determination criterion, symbol determination will be made by, for example, dividing the complex plane for mapping the receiving symbol 410a into a right and a left half in order to see which area the receiving symbol 410a belongs to.

Namely, letting the imaginary axis on the complex plane become the borderline for the phase-basis determination in advance, symbol determination will be made as follows: when the receiving symbol 410a belongs to, for example, the right-half on the complex plane, it will be determined as '1'; when the receiving symbol 410a belongs to the left-half, it will be determined as '0'.

Up to now, there are demonstrated the modulation system where symbol information of data transmitting is superimposed on an amplitude or phase of a single carrier as the propagation parameter. On the other hand, however, it is also possible to superimpose the symbol information on the difference value of amplitudes or phases between a plurality of single carriers. In this case, two methods are possible: one is to predetermine a particular single carrier to be used as the criteria for symbol determination; another is to providing a multiple carriers subset that comprises a plurality of single carriers.

As for the first method to predetermine a particular single carrier to be used as the criteria for symbol determination, the transmitting station 201 transmits the transmitting symbol information as amplitude or phase information for receiving signals received at the antenna of the receiving station 202. The receiving station 202 calculates the difference value of amplitudes or phases between the particular single carrier that is predetermined as the symbol determination criteria and other single carriers, and can demodulate the transmitting information by, for example, determining the bit characteristics with the calculation results.

As for the second method to provide a multiple carriers subset comprising a plurality of single carriers, on the other hand, the transmitting station 201 transmits the transmitting symbol information to the receiving station 202 as a relative amplitude or phase information between a plurality of single carriers that configure the predetermined multiple carriers subset. The receiving station 202 calculates each difference value between amplitudes or phases of a plurality of single carriers that configure a multiple carriers subset, on a subset-by-subset basis. Consequently, the demodulation of transmitting information is made possible by, for example, determining the bit characteristics with the calculation results.

Incidentally, in a radio propagation environment where the propagation channel 205a and the propagation channel 205b in the radio communication system 200 are virtually constant respectively, the reference table 309 for transmitting symbols can be generated with estimation values for the propagation channels 205a and 205b obtained in advance. As a result, there is no necessity for the propagation channel estimation means 305 as shown in FIG. 3, enabling the configuration of the transmitting station 201 to be more simplified.

Meanwhile, if the transmitting station 201 increases the number of antenna to three or more, there will be several patterns of antenna set available. Due to this, it will become furthermore difficult for a third party to demodulate or reconstruct the transmitting data 310 including confidential information. Further, if the transmitting station antennas 203a and 203b have a different directional pattern or polarization each other, it will become more difficult for a third party to estimate the power spectrums 206a and 206b, assuring a higher degree of security.

Incidentally, the way to get information on the downlink channel condition is as follows: in TDD, which makes use of the same frequency carrier both in uplink and downlink, it is possible for the transmitting station to estimate/measure the channel conditions with the uplink line from the receiving station, thanks to the channel's reciprocity characteristic. Embodiment 1 of the present invention is similar to this.

On the other hand, however, this invention is not exclusively applied to the TDD-radio communication system. This is because even in FDD, which makes use of a different frequency carrier between uplink and downlink, it is possible for the transmitting station to get correct information on the downlink channel condition only if the downlink channel condition is to be estimated/measured at the receiving station and notified to the transmitting station.

Embodiment 2

In the following examples will be demonstrated Embodiment 2 with reference to drawings.

Figure 6A:
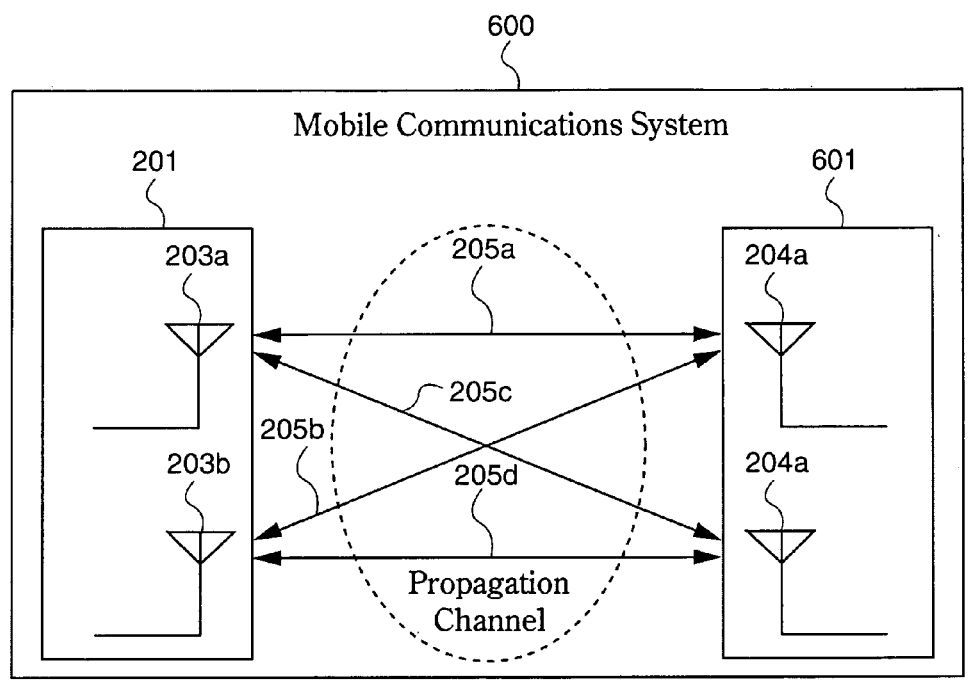
FIG. 6A is a block diagram showing a configuration of a radio communication system according to Embodiment 2 of the present invention.

FIG. 6A shows a radio communication system 600 according to Embodiment 2 of the present invention, having virtually the same configuration with the radio communication system 200 according to Embodiment 1, except that the receiving station 601 comprises a receiving station antenna 204b in addition to a receiving station antenna 204a.

Figure 6B:
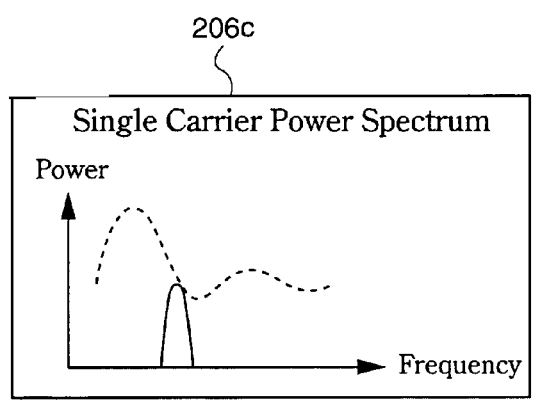
FIGS. 6B and 6C are figures showing a frequency spectrum that configures a propagation channel between a transmitting antenna and a receiving antenna.
Figure 6C:
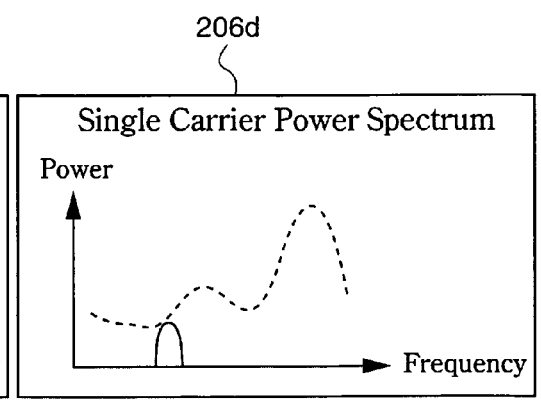

FIG. 6B shows a single carrier power spectrum 206c for a propagation channel 205c between a transmitting station antenna 203a and a receiving station antenna 204b. FIG. 6C shows a single carrier power spectrum 206d for a propagation channel 205d between a transmitting station antenna 203b and the receiving station antenna 204b.

Figure 7:
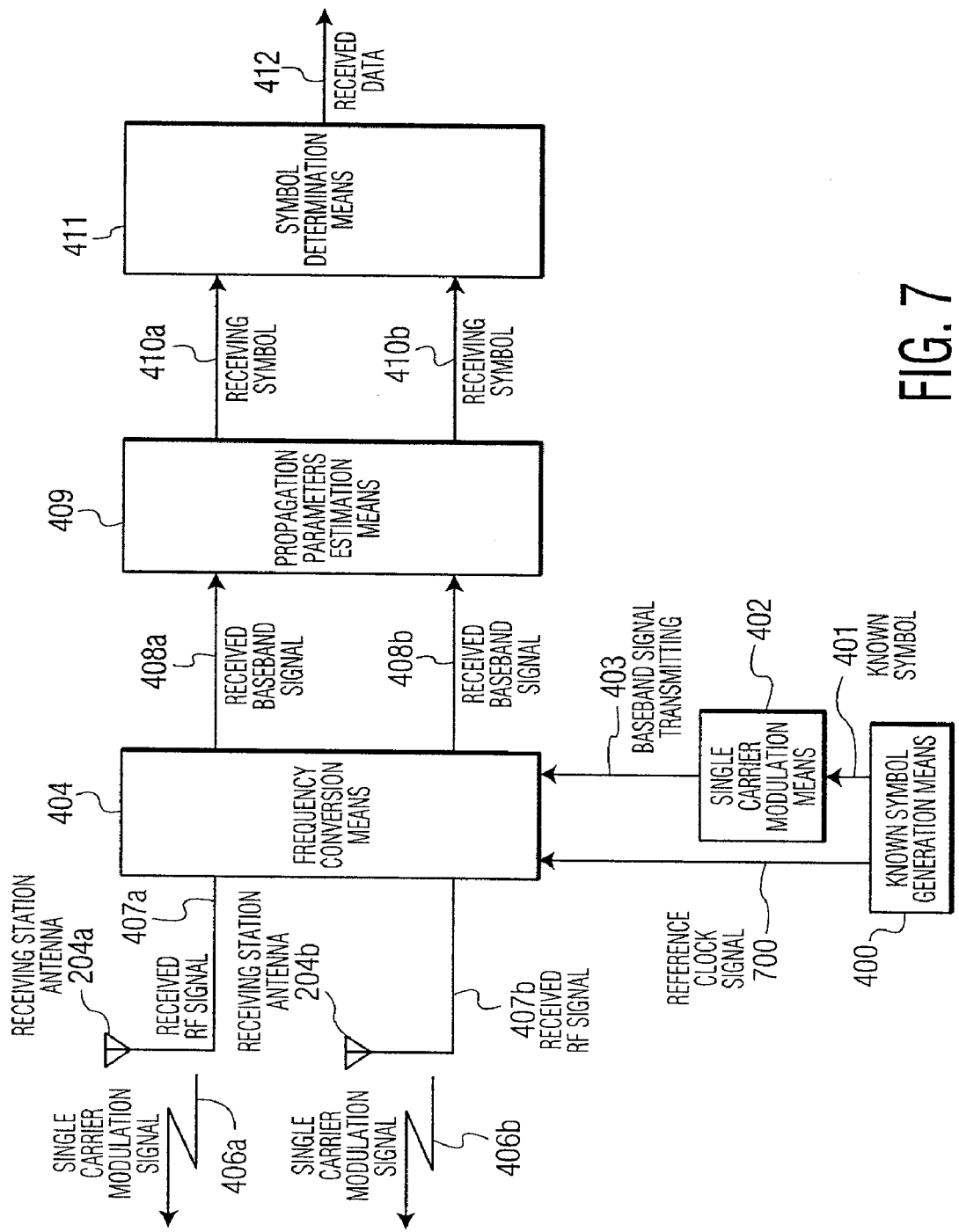
FIG. 7 is a block diagram showing a configuration of a receiving station according to Embodiment 2 of the present invention.

FIG. 7 is a block diagram showing a particular configuration of the receiving station 601. In FIG. 7, a known symbol generation means 400 is to generate a known symbol 401 as well as a reference clock signal 700 for determining the time-slot timing.

A frequency conversion means 404 is to switch between the receiving station antenna 204a and the receiving station antenna 204b in synchronization with time slots T1 and T2 respectively. Due to this, at Time 1 for example, the RF signal transmitting will be transmitting as a single carrier modulation signal 406a from the receiving station antenna 204a. On the other hand, at T2, the same RF signal transmitting will be transmitting as a single carrier modulation signal 406b from the receiving station antenna 204b.

Figure 16:
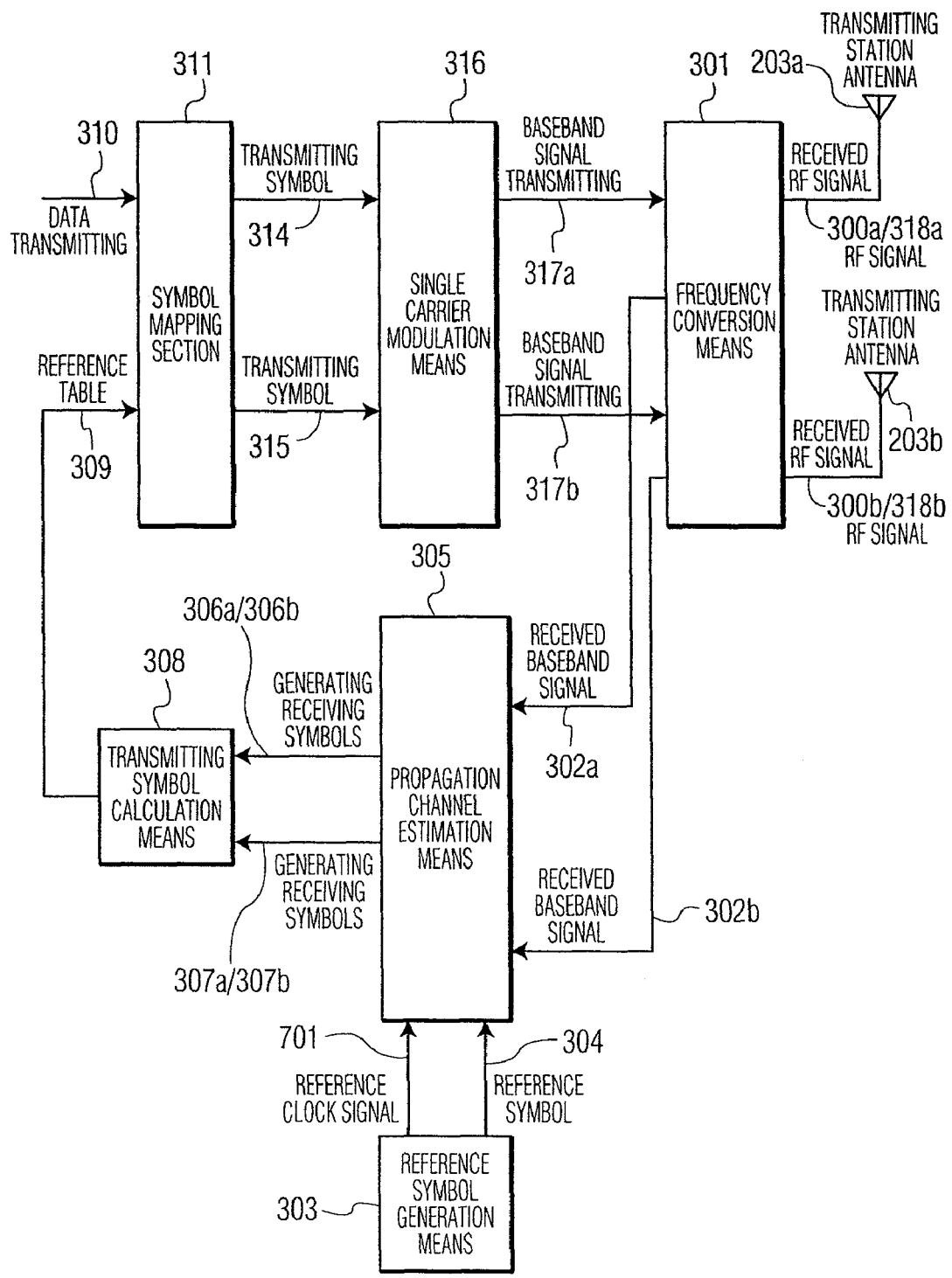
FIG. 16 is a block diagram showing a configuration of a transmitting station according to Embodiment 2 of the present invention.

FIG. 16 is a block diagram showing a configuration of the transmitting station 201 according to the present Embodiment.

The transmitting station 201 is different from that of Embodiment 1 in that a reference symbol generation means 303 is to generate a reference clock signal 701 for determining the time-slot timings T1 and T2 and generate two kinds of reference symbols 304 at each of the timings T1 and T2, and that a propagation channel estimation means 305 is to generate receiving symbols from baseband signals respectively at each of the timings T1 and T2.

In the following examples are demonstrated the radio communication method that is performed between the transmitting station 201 and the receiving station 601 as configured above.

First, in the receiving station 601, the known symbol 401 generated by the known symbol generation means 400 is modulated into a baseband signal transmitting 403 by a single carrier modulation means 402.

Next, the modulated baseband signals transmitting 403 are converted into RF signals transmitting 407a and 407b at the timings determined by the reference clock signals 700 that are generated by the known symbol generation means 400. Then a single carrier modulation signal 406a is transmitting from the antenna 204a at time slot T1 while a single carrier modulation signal 406b is transmitting from the antenna 204b at time slot T2 respectively.

As a next stage in the transmitting station 201, the single carrier modulation signal 406a transmitting from the receiving station antenna 204a and the single carrier modulation signal 406b transmitting from the receiving station antenna 204b are received at transmitting station antennas 203a and 203b.

Then, a frequency conversion means 301 separates the received single carrier modulation signal 406a and the received single carrier modulation signal 406b, from received RF signals 300a and 300b. By this means, received baseband signals 302a corresponding to the transmitting station antenna 203a and received baseband signals 302b corresponding to the transmitting station antenna 203b can be generated for each of the time slots T1 and T2, then being outputted to the propagation channel estimation means 305.

Next, at time slot T1, the propagation channel estimation means 305 processes these baseband signals 302a and 302b based on the reference symbol 304 that is generated by the reference symbol generation means 303, generating receiving symbols 306a and 307a, wherein the receiving symbol 306a is an estimate value for the complex propagation channel between the receiving station antenna 204a and the transmitting station antenna 203a and the receiving symbol 307a is an estimate value for the complex propagation channel between the receiving station antenna 204a and the transmitting station antenna 203b. In a similar way, at time slot T2 are generated receiving symbols 306b and 307b from the received baseband signals 302a and 302b based on the reference symbol 304, wherein the receiving symbol 306b is an estimate value for the complex propagation channel between the receiving station antenna 204b and the transmitting station antenna 203a while the receiving symbol 307b is an estimate value for the complex propagation channel between the receiving station antenna 204b and the transmitting station antenna 203b.

Next, a transmitting symbol calculation means 308 processes the receiving symbols 306a and 307a that are estimated from the receiving station antenna 204a and the receiving symbols 306b and 307b that are estimated from the receiving station antenna 204b, to calculate a plurality of pairs of transmitting symbol vectors, wherein each pair consists of two transmitting symbols respectively corresponding to the transmitting station antennas 203a and 203b, similarly to Embodiment 1. A reference table 309 comprises those a plurality of pairs of transmitting symbol vectors.

Explanation will be made in detail hereinafter on how to make a reference table 309 calculated by the transmitting symbol calculation means 308 in the transmitting station 201 in accordance with the symbol information for assumed data transmitting 310.

Two examples will be described hereinafter on how to calculate a transmitting symbol by a transmitting symbol calculation means 308: one is the case of using MMSE (Minimum Mean Square Error), a method more commonly utilized for calculating weighting factors for adaptive array antennas [B. Widrow, P. E. Mantey, L. J. Griffiths, and B. B. Goode, "Adaptive Antenna Systems", Proc. IEEE, vol. 55, no. 12, pp. 2143-2158, December 1967.]; and the other is case of using Zero-Forcing method [J. G. Proakis, Digital Communications, 3rd Edition, McGraw-Hill, New York, 1995.]

As for MMSE, weighting factors for the transmitting station antennas 203a and 203b should be calculated, for example, by assuming the receiving station antenna 204b to be the source of interference signals. When the calculated weighting factor is directly used as a transmitting symbol, it is made possible for the receiving station 601 to control the power of signals received at the receiving station antenna 204a to the maximum.

As for Zero-forcing method, on the other hand, weighting factors for the transmitting station antennas 203a and 203b should be calculated by assuming the receiving station antenna 204a to be the source of interference signals in reverse. When the calculated weighting factor is directly used as a transmitting symbol, it is made possible for the receiving station 601 to control the power of signals received at the receiving station antenna 204b to the minimum.

In the following are explained in detail how to calculate transmitting symbols and how to generate a reference table 309, with Zero-forcing method.

First is described how to calculate a plurality of pairs of transmitting symbol vectors, wherein each pair thereof consists of two transmitting symbols respectively corresponding to the transmitting station antenna 203a and transmitting station antenna 203b, for controlling the power of the receiving symbol 410a and the receiving symbol 410b in the receiving station 601.

Herein, letting the receiving symbols 306a and 307a be "h11" and "h12" respectively, and the receiving symbols 306b and 307b be "h21" and "h22" respectively, where channel matrix H, representing the propagation channel characteristics between the transmitting station antenna 203a/203b and the receiving station antenna 204a, is to be given by the following equation (6):

$$H = \begin{bmatrix} h11 & h12 \\ h21 & h22 \end{bmatrix} \qquad (6)$$

Next, letting the pseudo-inverse matrix (Moore-Penrose matrix) against the matrix H be "H$^+$", there is shown such a feature as given by the following equation (7):

$$H \cdot H^+ = J = \begin{bmatrix} s1 & 0 \\ 0 & s2 \end{bmatrix} \qquad (7)$$

where "H$^+$" is a 2-rows/2 columns matrix, J being a unit matrix, where its diagonal elements are comprising "s1" and "s2" while the rest of all elements are comprising zero.

However, in a case there exists an inverse matrix against the matrix H, "s1" and "s2" denote '1' respectively. Further, let the column vectors that configure the matrix H$^+$ be denoted by "w1" and "w2", then H$^+$ is given by the equation (8) as follows:

$$H^+ = [w1 \, w2] \qquad (8)$$

Herein, suppose the case that, in the transmitting station 201, "w1" and "w2" are the transmitting symbol vector to be selected or multiplexed depending on the data transmitting, being transmitting from the transmitting station antennas 203a and 203b toward the receiving station 601.

Due to above equations (7) and (8), a receiving signal can be given by the following formula (9) in a case where only "w1" is used for transmitting. In this case, the power of the receiving symbol 410a is virtually equal to $|s1|^2$ and the power of the receiving symbol 410b is virtually equal to zero.

$$y = \begin{bmatrix} y1 \\ y2 \end{bmatrix} = H \cdot (H^+ \cdot C10) + n = \begin{bmatrix} s1 \\ 0 \end{bmatrix} + n, \quad C10 = \begin{bmatrix} 1 \\ 0 \end{bmatrix} \quad (9)$$

where y1 denotes the receiving symbol 410a, y2 denotes the receiving symbol 410b, n denotes a noise component vector mainly due to thermal noise of receiving devices, and C10 denotes a symbol selection vector to be multiplied by H for selecting a transmitting symbol vector through the process.

Also, in a case where only "w2" is used for transmitting, a receiving signal can be given by the following formula (10). In this case, the power of the receiving symbol 410a is virtually equal to zero and the power of the receiving symbol 410b is virtually equal to $|s2|^2$.

$$y = \begin{bmatrix} y1 \\ y2 \end{bmatrix} = H \cdot (H^+ \cdot C01) + n = \begin{bmatrix} 0 \\ s2 \end{bmatrix} + n, \quad C01 = \begin{bmatrix} 0 \\ 1 \end{bmatrix} \quad (10)$$

where C01 is a symbol selection vector to be multiplied by H for selecting a transmitting symbol vector through the process.

Further, in a case where "w1" and "w2" are vector-multiplexed for transmitting, a receiving signal can be given by the following formula (11). In this case, the power of the receiving symbol 410a is virtually equal to $|s1|^2$ and the power of the receiving symbol 410b is virtually equal to $|s2|^2$.

$$y = \begin{bmatrix} y1 \\ y2 \end{bmatrix} = H \cdot (H^+ \cdot C11) + n = \begin{bmatrix} s1 \\ s2 \end{bmatrix} + n, \quad C11 = \begin{bmatrix} 1 \\ 1 \end{bmatrix} \quad (11)$$

where C11 denotes a symbol selection vector to be multiplied by H for selecting a transmitting symbol vector through the process.

Meanwhile, in a case where neither "w1" nor "w2" is used for transmitting, a receiving signal can be given by the following formula (12). In this case, it is natural that both of the power of the receiving symbols 410a and 410b are virtually equal to zero.

$$y = \begin{bmatrix} y1 \\ y2 \end{bmatrix} = H \cdot (H^+ \cdot C00) + n = \begin{bmatrix} 0 \\ 0 \end{bmatrix} + n, \quad C00 = \begin{bmatrix} 0 \\ 0 \end{bmatrix} \quad (12)$$

where C00 is a symbol selection vector to be multiplied by H for selecting a transmitting symbol vector through the process. Based on the above, it is made possible to control the power of the receiving symbol 410a in the receiving station antenna 204a by calculating the transmitting symbol vector $H^+ \cdot C$ with the aforementioned symbol selection vector C (C10, C01, C11, C00), and by transmitting this transmitting symbol vector $H^+ \cdot C$ as a transmitting symbol from the transmitting station antennas 203a and 203b.

For example, let the transmitting information be denoted by four 2-bit values like [10, 01, 11, 00], the transmitting station 201 will select $H^+ \cdot C0$ for transmitting when the transmitting bit is '1', and will select $H^+ \cdot C1$ for transmitting when the transmitting bit is '0'. Due to this, it is made possible for the receiving station to perform the bit determination based on the power of the receiving symbol 410a. Therefore, the configuration of the reference table 309 generated by the transmitting symbol calculation means 308 is shown by FIG. 19.

Incidentally, in a case where the number of antennas in the transmitting station is three, the same process can be applied to as in the case of two antennas thereof if only considering the fact that the channel matrix H becomes 2-rows/3-columns matrix. In this case, because $H^+$ becomes 2-rows/3-columns matrix, each of "w1" and "w2" will become a 3 dimensional vector.

As described above, the transmitting station 201 and the receiving station 601 cooperatively calculate the propagation parameter therebetween in advance with known symbols, and store it as a reference table.

Next, data transmitting 310 is calculated in the symbol mapping section 311 as a set of transmitting symbols 314 and 315 with the aforementioned reference table, so that the power variation of the receiving symbol 410a in the receiving station 601 can correspond to the data sequence of the data transmitting 310.

Then, the transmitting symbols 314 and 315 are processed in the single carrier modulation means 316 to generate a baseband signal transmitting 317a and a baseband signal transmitting 317b.

Next, the baseband signals transmitting 317a and 317b are simultaneously converted into RF signals transmitting 318a and 318b by the frequency conversion means 301, then being transmitting from the transmitting station antennas 203a and 203b toward the receiving station 601.

Then, the RF signals 318a and 318b transmitting from the transmitting station 201 are synthesized and received by the receiving station antenna 204a, converted into a received baseband 408a through the frequency conversion means 404. On the other hand, at the receiving station antenna 204b, the RF signals 318a and 318b are also synthesized and received, converted into a received baseband 408b through the frequency conversion means 404 in a similar way.

Next, orthogonal detection is made to this baseband signal 408a by a propagation parameter estimation means 409 to generate the receiving symbol 410a as a complex symbol. In the same manner, orthogonal detection is made also to the baseband signal 408b by the propagation parameter estimation means 409 to generate the receiving symbol 410b as a complex symbol.

Next, the difference of powers between the receiving symbols 410a and 410b is calculated by a symbol determination means 411. Then the calculated value of the power-difference is determined based on predetermined particular thresholds. Namely, whether the symbol should be '1' or '0' will be determined depending on whether the power-difference is no fewer than the threshold or no more than that. The results will be outputted as a received data 412.

In this manner, the transmitting data 310 including confidential information that are transmitting from the transmitting station 201 will be demodulated.

Therefore, in a radio communication system as described above where demodulation of the transmitting data 310 is made based on the relative power-difference between the receiving station antennas 204a and 204b, a third party in another receiving station has to specify all the four propagation channels configured by the two antennas in the receiving station 601 and the two antenna in the transmitting station 201 in order to demodulate or reconstruct the transmitting data 310 including confidential information. For this reason, it is made possible for the present embodiment to transmit confidential information with even a higher degree of security.

Incidentally, in this embodiment, the receiving station 601 is so configured that the single carrier modulation signals 406 modulated from the known symbol 401 are separately transmitting from the receiving station antennas 204a and 204b at different time slots T1 and T2. However, it is not limited to this configuration. It is also configured in such a way that two known symbols P1 and P2, with mutually-perpendicular codes, will be transmitting at a same time slot, wherein the known symbol P1 will be transmitting from the receiving station antenna 204a and the known symbol P2 will be transmitting from the receiving station antenna 204b.

In this case, in the transmitting station 201, the reference symbol generation means 303 generates a reference symbol 304a as the same symbol with the known symbol P1 and a reference symbol 304b as the same symbol with the known symbol P2. Then, the propagation channel estimation means 305, inputting the received baseband signals 302a and 302b, will generate the receiving symbols 306a and 307a based on the reference symbol 304a, wherein the receiving symbol 306a is an estimate value for the complex propagation channel between the receiving station antenna 204a and the transmitting station antenna 203a and the receiving symbol 307a is an estimate value for the complex propagation channel between the receiving station antenna 204a and the transmitting station antenna 203b. In the same manner as this, the propagation channel estimation means 305, inputting the received baseband signals 302a and 302b, will generate the receiving symbols 306b and 307b based on the reference symbol 304b, wherein the receiving symbol 306b is an estimate value for the complex propagation channel between the receiving station antenna 204b and the transmitting station antenna 203a and the receiving symbol 307b is an estimate value for the complex propagation channel between the receiving station antenna 204b and the transmitting station antenna 203b.

Figure 20:
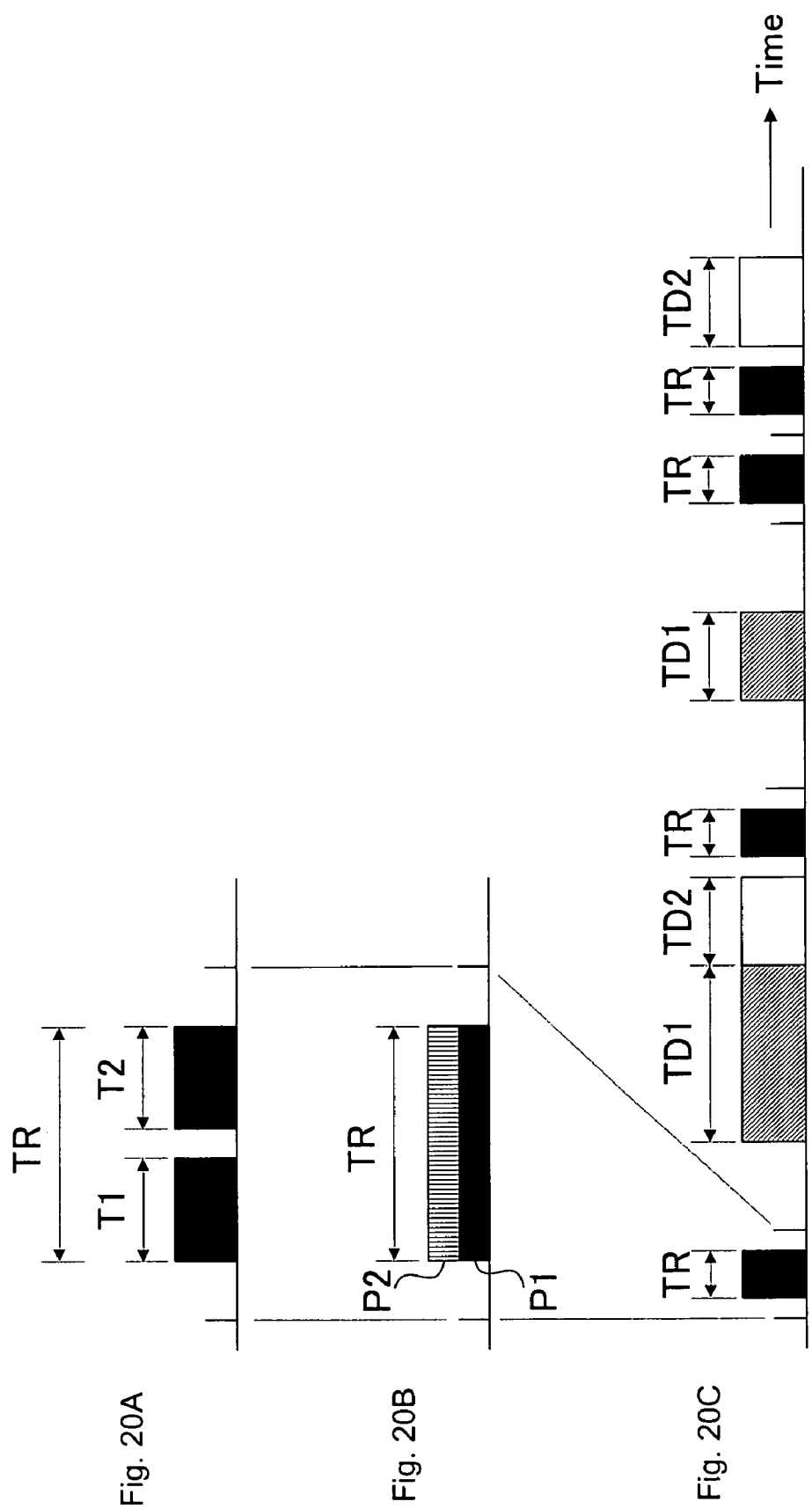
FIGS. 20A, 20B and 20C are figures showing away of allocating transmission times for a known symbol according to Embodiment 2 of the present invention.

FIGS. 20A to 20C show how to allocate the transmitting time to the known symbol 401 and the known symbol P1 or P2. FIG. 20A shows an example where the known symbol 401 is transmitting from the two receiving station antennas 204a and 204b in time-division. For example, the known symbol 401 is transmitting from the receiving station antenna 204a within the time length T1, and transmitting from the receiving station antenna 204b within the time length T2. In this case, let the time length for transmitting the known symbol 401 from the two antennas be denoted by TR.

Meanwhile, FIG. 20B shows an example where the known symbols P1 and P2 with mutually-perpendicular codes are multiplexed and transmitting simultaneously from each of the receiving station antennas 204a and 204b within the time length TR.

Further, in a radio communication system exemplified by cellular TDMA (Time Division Multiple Access) method as represented by cellular mobile phone and Frequency Detection Access (Carrier Sense Access) method for WLAN, wherein a plurality of communication channels share the time for access each other in order to assure access, explanation will be made hereinafter on how to allocate time TR that is necessary for the aforementioned known symbols transmitting with reference to FIG. 20C.

In FIG. 20C, TD1 and TD2 denote the time respectively allocated to different communication channels. In general, it is believed that TD1 and TD2 will vary depending on the length of transmitting data sequences. Further it is not always necessary that the times occupied by TD1 and TD2 should be allocated periodically. Therefore, the receiving station 601 can allocate TR at an appropriate timing within the time not occupied by TD1 and TD2 in order to transmit known symbols, by defining in advance that TR, the time for transmitting the known symbols, should utilize the time slot that is not occupied by TD1 and TD2.

Incidentally, if the number of antennas used in the receiving station 601 increases to three or more, the more kinds of antenna-sets will be available. As a result it will become even more difficult for a third party to demodulate or reconstruct the data transmitting 310 including confidential information by other receiving stations, thus assuring more high security.

Embodiment 3

FIG. 8A shows a radio communication system 800 according to the present Embodiment. In FIG. 8A, the radio communication system 800 comprises a transmitting station 801 and a receiving station 802 and is different from Embodiment 1 in that it performs a multiple carriers radio communication as represented by OFDM (orthogonal frequency division multiplexing) and so forth.

FIG. 8B shows eight pieces of sub-carrier elements 803a to 803h configuring the multiple carriers, FIG. 8C shows a multiple carriers power spectrum 804a for a propagation channel 205a between a transmitting station antenna 203a and a receiving station antenna 204a, and FIG. 8D shows a multiple carriers power spectrum 804b for a propagation channel 205b between a transmitting station antenna 203b and the receiving station antenna 204a. The power spectrums 804a and 804b, being calculated from the respective propagation channel estimate values for each of the eight sub-carrier elements, are to configure the multiple carriers frequency spectrum in total. The number of sub-carriers, however, is not limited to eight. It is just configured by a eight sub-carriers herein as a matter of convenience for demonstrating the present Embodiment.

As already described in Embodiment 1, the multiple carriers power spectrums 804a and 804b show a different characteristic each other. Further, it is quite natural that a multiple carriers frequency spectrum, which is estimated by another radio station with a different propagation path, should exhibit another different characteristic.

Figure 9:
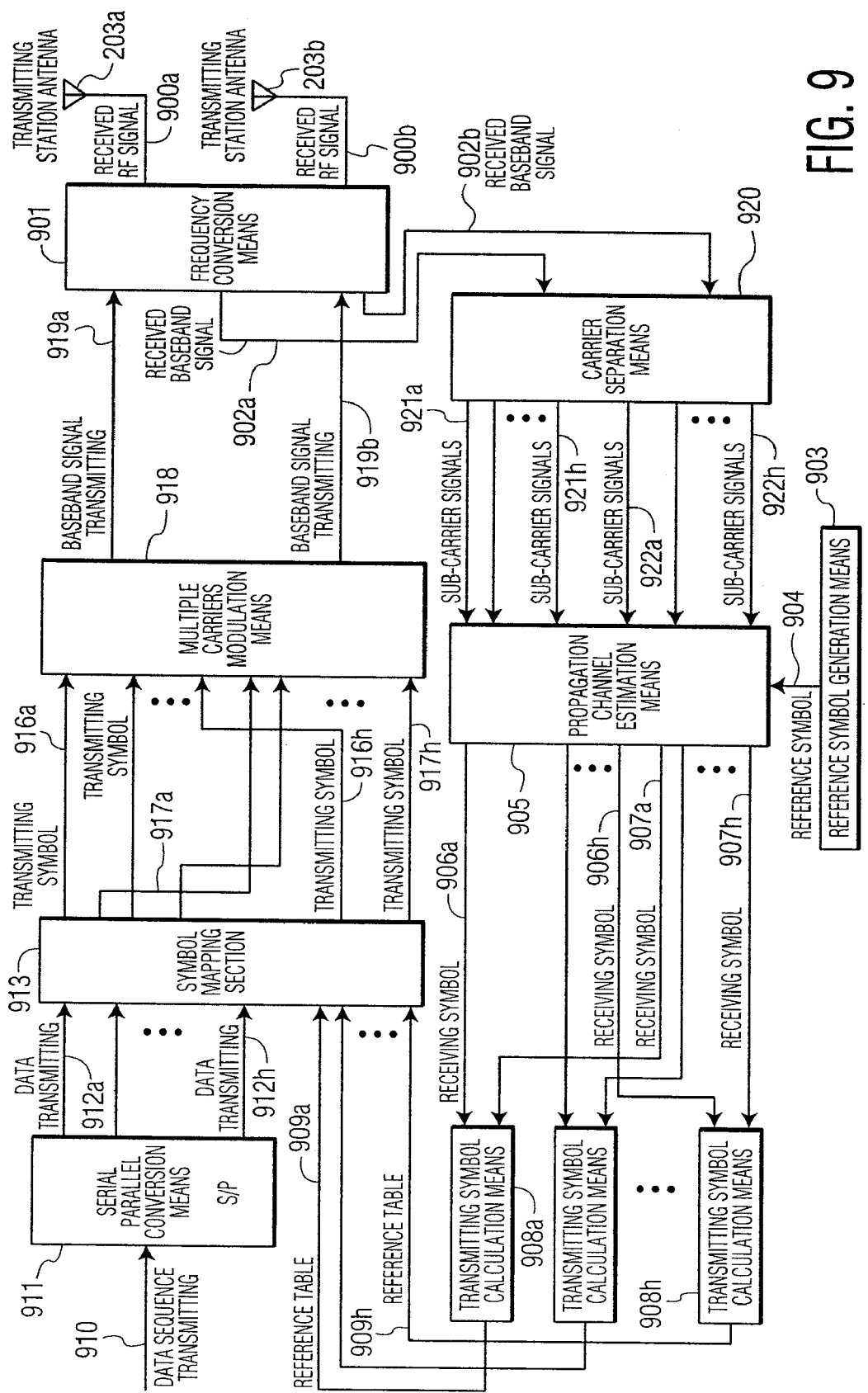
FIG. 9 is a block diagram showing a configuration of a transmitting station according to Embodiment 3 of the present invention.
Figure 10:
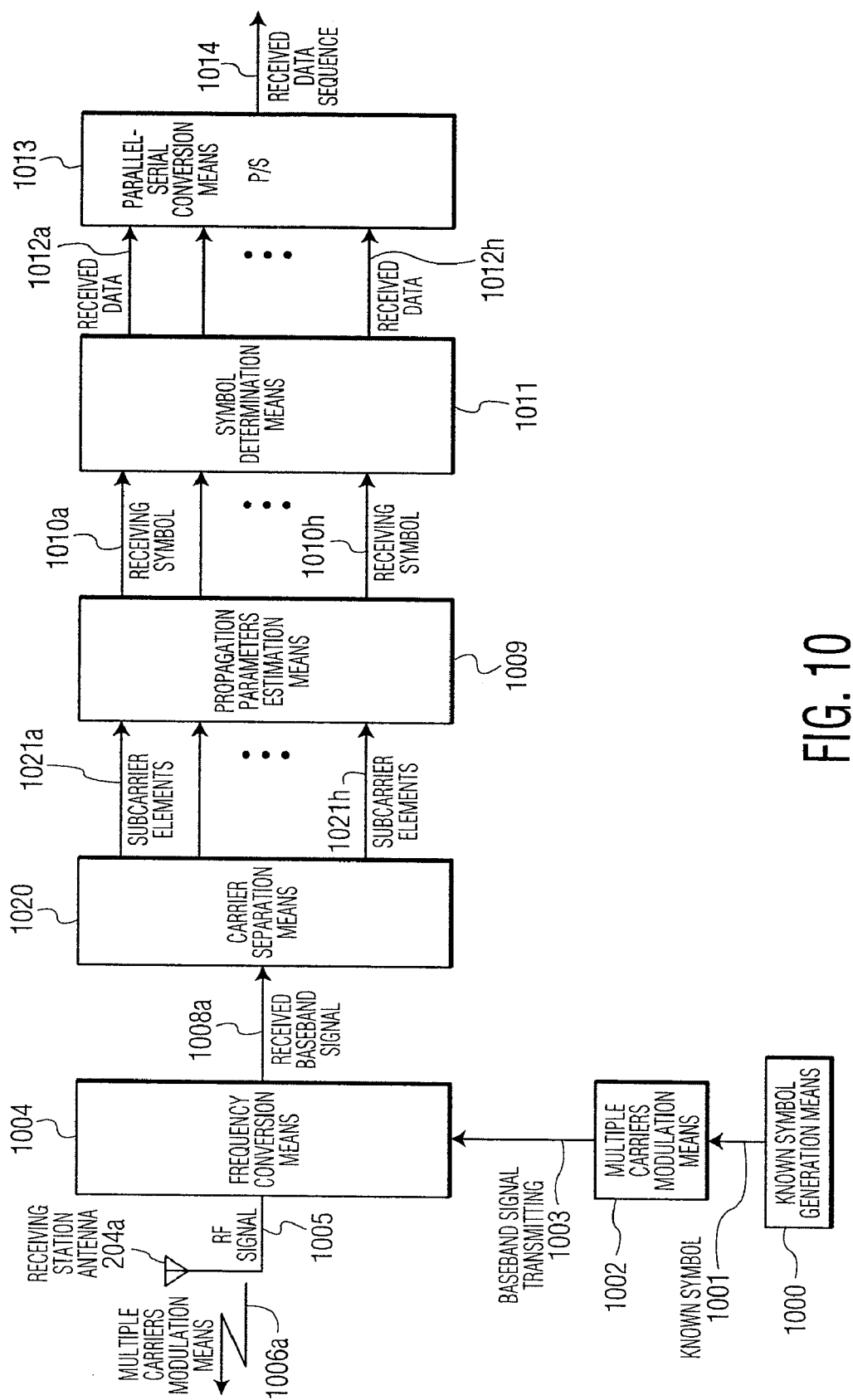
FIG. 10 is a block diagram showing a configuration of a receiving station according to Embodiment 3 of the present invention.
Figure 11:
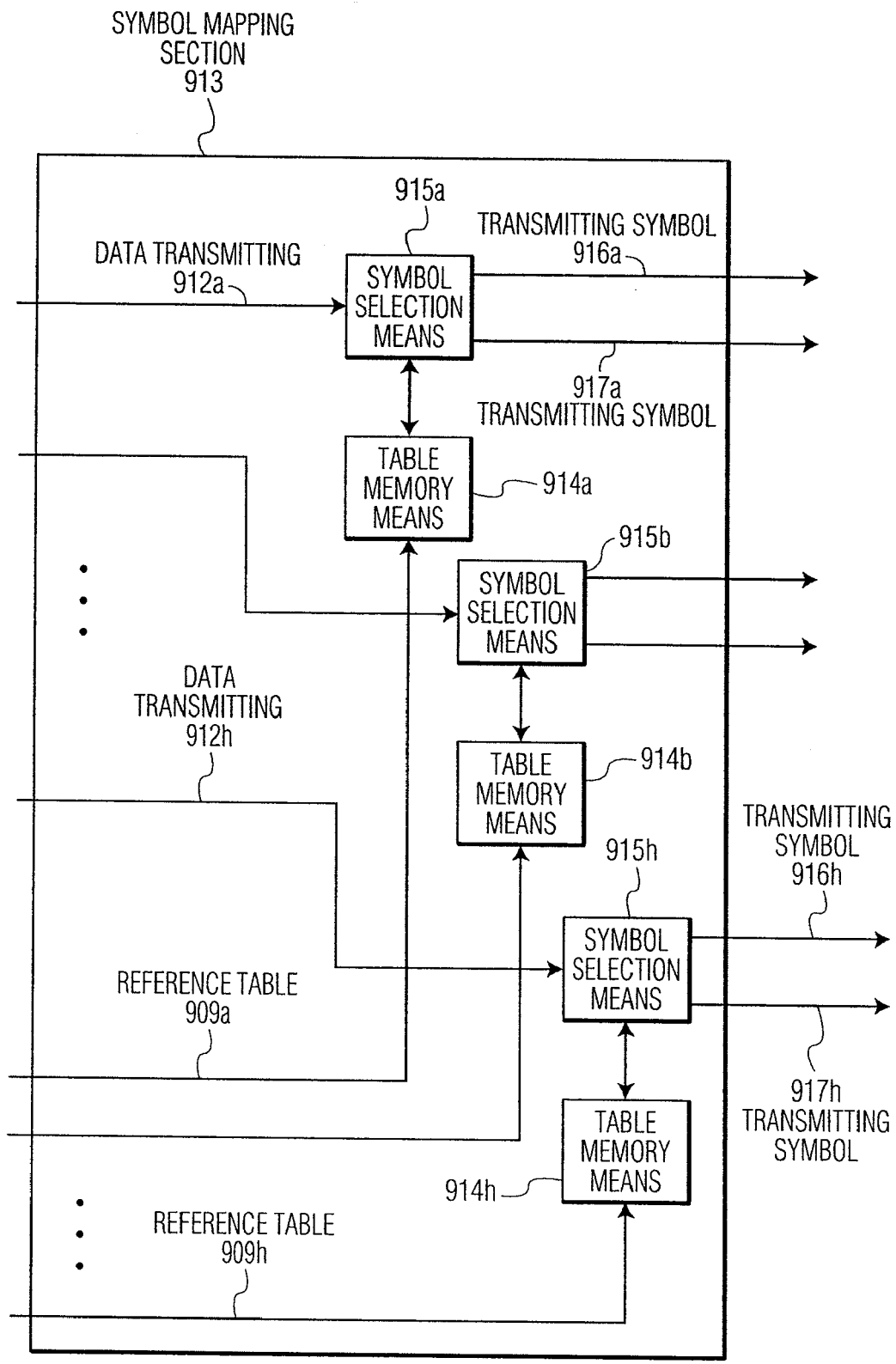
FIG. 11 is a block diagram showing a symbol mapping station of the transmitting station according to Embodiment 3 of the present invention.

Hereinafter, FIGS. 9 and 11 show a particular configuration of the transmitting station 801 and FIG. 10 shows a particular configuration of the receiving station 802.

In FIG. 10, a known symbol generation means 1000 is to generate known symbols 1001 shared between the transmitting station 801 and the receiving station 802 for each of the sub-carrier elements 803a to 803h. A multiple carriers modulation means 1002 is to modulate the known symbol 1001 to a baseband signal transmitting 1003 with the sub-carrier elements 803a to 803h. A frequency conversion means 1004 is to convert the baseband signal transmitting 1003 into a RF signal 1005 transmitting, or to convert RF signals received at the antenna 204a into a received baseband signal 1008a. A propagation parameter estimation means 1009 is to generate receiving symbols 1010a to 1010h (complex symbols) from the received baseband signals 1008a by means of orthogonal detection. A symbol determination means 1011 is to perform determination of each receiving symbol 1010a to 1010h based on predetermined criteria. The antenna 204a is to send the RF signal 1005 as a multiple carriers modulation signal 1006a.

In FIG. 9, a transmitting station antenna 203a and a transmitting station antenna 203b in the transmitting station 801 is to receive the RF signals sent from the receiving station 802 simultaneously, or transmit. A frequency conversion means 901 is to convert received RF signals 900a and 900b into received baseband signals 902a and 902b respectively.

On the other hand, a reference symbol generation means 903 is to generate a reference symbol 904, which is the same symbol with the known symbol 1001, for giving a phase reference to the received baseband signals 902a and 902b.

A carrier separation means 920 is to separate the received baseband signals 902a and 902b into eight pieces of sub-carrier elements 803a to 803h by means of FFT (Fast Fourier Transform) or band-limiting filtering process. A propagation channel estimation means 905 is to generate eight pieces of receiving symbols 906a to 906h and also eight pieces of receiving symbols 907a to 907h based on the reference symbol 904, wherein the receiving symbols 906a to 906h are the estimate values for the complex propagation channel between the receiving station antenna 204a and the transmitting station antenna 203a while the receiving symbols 907a to 907h are the estimate values for the complex propagation channel between the receiving station antenna 204a and the transmitting station antenna 203b.

Transmitting symbol calculation means 908a to 908h is to correspond to the eight pieces of sub-carrier elements 803a to 803h respectively This transmitting symbol calculation means 908a to 908h separately calculate a plurality of pairs of transmitting symbol vectors, wherein each pair is made of two transmitting symbols that are respectively corresponding to the transmitting station antenna 203a and the transmitting station antenna 203b. Then, reference tables 909a to 909h (eight, in total) are generated for each of the sub-carrier elements 803a to 803h, wherein each reference table is made of the calculated a plurality of pairs of transmitting symbol vectors. For example, the transmitting symbol calculation means 908a that are corresponding to the sub-carrier element 803a, calculates a plurality of pairs of complex symbol vectors from the receiving symbols 906a and 907a that are corresponding to sub-carrier element 803a, in order to control the power of the receiving symbol 1010a in the receiving station 802 as in the same manner with Embodiment 1. A reference table 909a is made of those calculated a plurality of pairs of complex symbol vectors. The aforementioned process is to be repeated for all of the sub-carrier elements in a similar way, thus generating eight transmitting symbol reference tables 909a to 909h.

A serial-parallel conversion means 911 is to apply a parallel conversion to the data sequence transmitting 910 for each of the sub-carrier elements.

A symbol mapping section 913 is to calculate set between transmitting symbols 916a to 916h and transmitting symbols 917a to 917h from data transmitting 912a to 912h so that the power of the receiving symbols 1010a to 1010h in the receiving station 802 can be set equal to or more than the particular threshold, or below. Configuration of the symbol mapping section 913 will be demonstrated hereinafter.

FIG. 11 is a block diagram showing a configuration of the symbol mapping section 913.

In FIG. 11, the symbol mapping section 913 comprises table memory means 914a to 914h for storing the reference tables 909a to 909h and symbol selection means 915a to 915h.

The symbol selection means 915a to 915h are to select a transmitting symbol from the group 916a to 916h (that is a group corresponding to the transmitting station antenna 203a) and select another from the group 917a to 917h (a group corresponding to the transmitting station antenna 203b) for each of the sub-carrier elements 803a to 803h, based on the data transmitting 912a to 912h, referring to the table memory means 914a to 914h.

Next, a multiple carriers modulation means 918 is to generate a baseband signal transmitting 919a from the input transmitting symbols 916a to 916h with the eight sub-carrier elements 803a to 803h, and to generate a baseband signal transmitting 919b from the input transmitting symbols 917a to 917h with the eight sub-carrier elements 803a to 803h.

In the following examples are demonstrated the way of radio communication to be performed between the transmitting station 801 and the receiving station 802 as configured above.

First, the known symbols 1001, which are respectively generated for each of the sub-carrier elements 803a to 803h by the known symbol generation means 1000 in the receiving station 802, are modulated to the baseband signals transmitting 1003 by the multiple carriers modulation means 1002.

Next, the modulated baseband signals transmitting 1003 are converted into the RF signals transmitting 1005 by the frequency conversion means 1004, being transmitting from the antenna 204a as multiple carriers modulation signals 1006a.

Next, the multiple carriers modulation signals 1006a transmitting from the receiving station 802 are simultaneously received at the antennas 203a and 203b in the transmitting station 801, to be converted into the received baseband signals 902a and 902b respectively by the frequency conversion means 901.

Next, each of the baseband signals 902a and 902b is separated into eight sub-carrier elements 803a to 803h by the carrier separation means 920. Then, in the propagation channel estimation means 905, they are processed based on the reference symbol 904 that is generated by the reference symbol generation means 903, generating eight receiving symbols 906a to 906h and another eight receiving symbols 907a to 907h respectively; wherein the former are the estimate values for the complex propagation channel between the receiving station antenna 204a and the transmitting station antenna 203a, while the latter are the estimate values for the complex propagation channel between the receiving station antenna 204a and the transmitting station antenna 203b.

Then, these receiving symbols 906a to 906h and 907a to 907h are processed in the transmitting symbol calculation means 908a to 908h, to be calculated as a plurality of pairs of transmitting symbol vectors wherein the two elements included in one pair (of transmitting vector) is corresponding to the transmitting station antenna 203a and 203b respectively. Thus eight kinds of reference tables 909a to 909h are made, each of the reference tables comprising the calculated a plurality of pairs of transmitting symbol vectors.

In this manner, both of the transmitting station 801 and the receiving station 802 calculate in advance the propagation parameters therebetween with the known symbols to store the results as a reference table.

In such a condition, the confidential data transmitting 910 is parallel-converted by the serial-parallel conversion means 911 and then inputted to the symbol mapping section 913.

Next, the signals transmitting 912a to 912h, divided into eight signals, are processed by the symbol mapping section 913 with the reference tables. As a result, there are calculated eight pairs of transmitting symbols from the pair symbols 916a and 917a to the pair symbols 916h and 917h so that the power variation of the receiving symbols 1010a to 1010h in the receiving station 802 can be equal to the data sequence transmitting 910.

Then, those transmitting symbols 916a to 916h and 917a to 917h are processed in the multiple carriers modulation means 918 to generate baseband signals transmitting 919a and 919b.

Next, the baseband signal transmitting 919a is converted into the RF signal transmitting 900a by the frequency conversion means 901, then being transmitting from the transmitting station antenna 203a to the receiving station 802. At the same time, the baseband signal transmitting 919b is converted into the RF signal transmitting 900b by the frequency conversion means 901, then being transmitting from the transmitting station antenna 203b to the receiving station 802.

Then, in the receiving station 802, the RF signal 900a transmitting from the transmitting station antenna 203a in the transmitting station 801 and the RF signal 900b transmitting from the transmitting station antenna 203b thereof are synthesized and received at the receiving station antenna 204a. This receiving signal, denoted by RF signal 1005, are converted into the received baseband signal 1008a by the frequency conversion means 1004.

The baseband signal 1008a is separated into eight sub-carrier elements 803a to 803h in a carrier separation means 1020 by means of orthogonal detection after FFT (Fast Fourier Transform) or band-limiting filtering process Then, from the signals of the separated sub-carrier elements 1021a to 1021h, there are detected the receiving symbols 1010a to 1010h as a complex symbol by the propagation parameter estimation means 1009.

Next, in the symbol determination means 1011, symbol determination is performed for the generated receiving symbols 1010a to 1010h based on predetermined criteria, thus generating received data 1012a to 1012h.

Then, these received data 1012a to 1012h are converted into a received data sequence 1014 (a serial data sequence) by a parallel-serial conversion means 1013, thus reconstructing the data sequence 910 including confidential information that were transmitting from the transmitting station 801.

In the following examples are particularly demonstrated the above operation.

For example, supposing that the data sequence transmitting 910 is a binary data sequence "10001101" and is transmitting by allocating the sequence to each of the sub-carrier elements sequentially for transmitting the 8 bits of information.

First, in the symbol mapping section 913 of the transmitting station 801, the symbol selection means 915a selects the set of transmitting symbols 916a and 917a from the table memory means 914a so that, when the data transmitting 912a is '1' for example, the power of the receiving symbol 1010a in the receiving station 802 can be equal or more than the particular threshold. On the other hand, when the data transmitting 912a is '0', the symbol selection means 915a selects the set of transmitting symbols 916a and 917a from the table memory means 914a so that the power of the receiving symbol 1010a is less than the particular power threshold 1401.

Then, the selected transmitting symbols are modulated and transmitting from the antenna 203a and antenna 203b.

In the next place, in the symbol determination means 1011 of the receiving station 802 that received the above signals, it is determined as '1' when the powers of the respective receiving symbols 1010a to 1010h (that are separated from the received baseband signal 1008a into eight sub-carrier elements 803a to 803h) is equal to or more than the particular power threshold 1400, and determined as '0' when the powers thereof is less than the threshold. Data is to be reconstructed in this manner. If determination of the powers of the receiving symbols 1010a to 1010h is resulted to be equal to 10001101 corresponding to the data sequence transmitting 910 (that is, "10001101"), it is recognized that data has been accurately transmitting.

Such way of controlling is made possible because a power, phase difference and so forth of the arrival path at the receiving antenna side will be changed due to the change of the directional pattern on the transmitting antenna side. Due to this, the multiple carriers power spectrums of receiving signals will also be changed.

Namely, the change of amplitudes and phases of the transmitting symbols 916a to 916h and the transmitting symbols 917a to 917h that are all complex symbols will cause the change of synthesized directional pattern made at the transmitting station antennas 203a and 203b. Consequently it is true that the signal power of the receiving symbols 1010a to 1010h received at the receiving station antenna 204a will be changed.

Further, the multiple carriers power spectrums 804a and 804b depend on the propagation spaces configured between the transmitting station and the receiving station, characterizing their physical relationship. For this reason, in a receiving station other than the receiving station 802, even the same signal that are transmitting from the same transmitting station 801 will have a frequency spectrum different from the multiple carriers power spectrums 804a and 804b observed for the receiving station 802.

Therefore, according to the present Embodiment, it is difficult for other receiving stations to demodulate or reconstruct the data sequence transmitting 910 including confidential information.

Meanwhile in the transmitting symbol calculation means 908a to 908h, the transmitting symbols 916a to 916h corresponding to the transmitting station antenna 203a and the transmitting symbols 917a to 917h corresponding to the transmitting station antenna 203b are respectively complex symbols. Therefore in the above Embodiment is described the case of varying the amplitude of transmitting symbol so that the power of the receiving symbol 1010a to 1010h in the receiving station 802 can be controlled. But it is not limited to the case. It is also possible to configure such transmitting symbol calculation means 908a to 908h whereby transmitting symbols for controlling the phase of the receiving symbols 1010a to 1010h will be made.

In this case, the propagation parameter estimation means 1009 estimates the receiving symbols 1010a to 1010h as a complex symbol respectively. Therefore, in the symbol determination means 1011, let the receiving symbols 1010a to 1010h be mapped as a phase difference against the reference symbol over the complex plane and this complex plane be separated into a right and a left half for example, symbol determination can be made depending on which area (right half/left half) the receiving symbols 1010a to 1010h belong to.

Namely, letting the imaginary axis on the complex plane be the borderline for the phase-basis determination in advance, symbol determination can be made as follows: when the receiving symbol 1010a to 1010h belong to, for example, the right half of the complex plane, it will be determined as '1'; when the receiving symbol 1010a to 1010h belong to the left half, it will be determined as '0'.

In the radio communication system 800 according to the present Embodiment, if a third party intends to specify the data sequence transmitting 910, it is necessary for the third party to accurately estimate the propagation channel between the transmitting station 801 and the receiving station 802 in all of the a plurality of sub-carrier elements. As a result, even higher degree of security is made possible for data transmitting as compared with the single-carrier-basis radio communication system.

Incidentally, in the above description hitherto are demonstrated the radio communication system configured based on frequency multiplexing system as represented by OFDM (orthogonal frequency division multiplexing). In addition, however, it can be also applied to CDMA (Code Division Multiple Access) with the radio communication system configured in the same way as the present Embodiment, if only sub-carrier elements of OFDM are corresponded to the spread codes of CDMA.

On the other hand, suppose CDMA using spread spectrum modulation method, the sub-carrier elements 803a to 803h in the radio communication system according to the present Embodiment are to be replaced by spread codes C1 to C8 respectively. In the followings are demonstrated the operation in this case.

First, in the receiving station 802, the multiple carriers modulation means 1002 spreads the known symbol 1001 by the spread codes C1 to C8 to generate the baseband signal transmitting 1003, the signal being transmitting at the receiving station antenna 204a.

As the next stage, in the transmitting station 801, the propagation channel estimation means 905 applies reverse spread process to the received baseband signals 902a and 902b with eight spread codes C1 to C8, generating eight receiving symbols 906a to 906h and eight receiving symbols 907a to 907h based on the reference symbol 904, wherein the receiving symbols 906a to 906h are the estimate values for the complex propagation channel between the receiving station antenna 204a and the transmitting station antenna 203a, while the receiving symbols 907a to 907h are the estimate values for the complex propagation channel between the receiving station antenna 204a and the transmitting station antenna 203b.

Then, the transmitting symbol calculation means 908a to 908h separately calculate a plurality of pairs of transmitting symbol vectors from the receiving symbols 906a to 906h and 907a to 907h, wherein each pair of transmitting symbol vector consists of two transmitting symbols each of which is corresponding to the transmitting station antennas 203a and 203b respectively. And then eight reference tables 909a to 909h are made of the calculated a plurality of pairs of transmitting symbol vectors depending on each of the reference codes C1 to C8.

As described above, both of the transmitting station 801 and the receiving station 802 calculate the propagation parameters between them in advance with the symbols known by both sides, then storing the result as reference tables.

Next, when the number of spread codes for the data transmitting 910 is eight, the serial-parallel conversion means 911 does apply parallel-conversion to it, the data sequence 910 being buffered on a 8data-by-8data basis. The data transmitting 912a to 912h are outputted in parallel to the symbol mapping section 913.

Then, in the symbol mapping section 913, the data transmitting 912a to 912h are calculated to become the pairs of transmitting symbols 916a and 917a, 916b and 917b, . . . to 916h and 917h with the reference tables so that the change of the powers of the receiving symbols 1010a to 1010h in the receiving station 802 can be equal to the data sequence transmitting 910.

Next, the multiple carriers modulation means 918 performs spread process to generate the baseband signal transmitting 919a from the transmitting symbols 916a to 916h with eight spread codes C1 to C8, then transmitting it from the transmitting station antenna 203a. In the same manner is generated the baseband signal transmitting 919b from the transmitting symbols 917a to 917h by spread process with eight spread codes C1 to C8, then being transmitting from the transmitting station antenna 203b.

Then, in the receiving station 802, the propagation parameter estimation means 1009 applies reverse spread process to the baseband signals 1008 received at the antenna 204a with eight spread codes C1 to C8. Trough the process are separated the signals into eight receiving symbols (all are complex symbols) 1010a to 1010h and detected by orthogonal detection with eight spread codes.

After that, the symbol determination means 1011 reconstructs the data sequence transmitting 910 including confidential information from the receiving symbols 1010a to 1010h.

In such CDMA-basis radio communication system as described above, even higher degree of security can be assured not only thanks to the CDMA-basis confidentiality but also by using the modulation method that utilizes the random-characteristics of propagation parameters.

Incidentally, in a radio propagation environment of the radio communication system 800 wherein the propagation channels 205a and 205b are deemed to be virtually constant, the reference table 909a and 909h can be generated by using the pre-obtained estimate values for the propagation channels 205a and 205b. In this case, the propagation channel estimation means 905 as shown in FIG. 9 is made unnecessary, realizing a simple configuration of the transmitting station 801.

Meanwhile, if the number of antennas in the transmitting station 801 increases to three or more, that allows wider variation of antenna-set available. That leads it more difficult for a third party to demodulate or reconstruct the data sequence transmitting 910 including confidential information by other receiving stations. Further, if the transmitting station antennas 203a and 203b are made to have a different directional pattern each other, it will become furthermore difficult for a third party to estimate the power spectrums 804a(206a?) and 804b(206b?), assuring even higher degree of security.

Embodiment 4

Figure 12A:
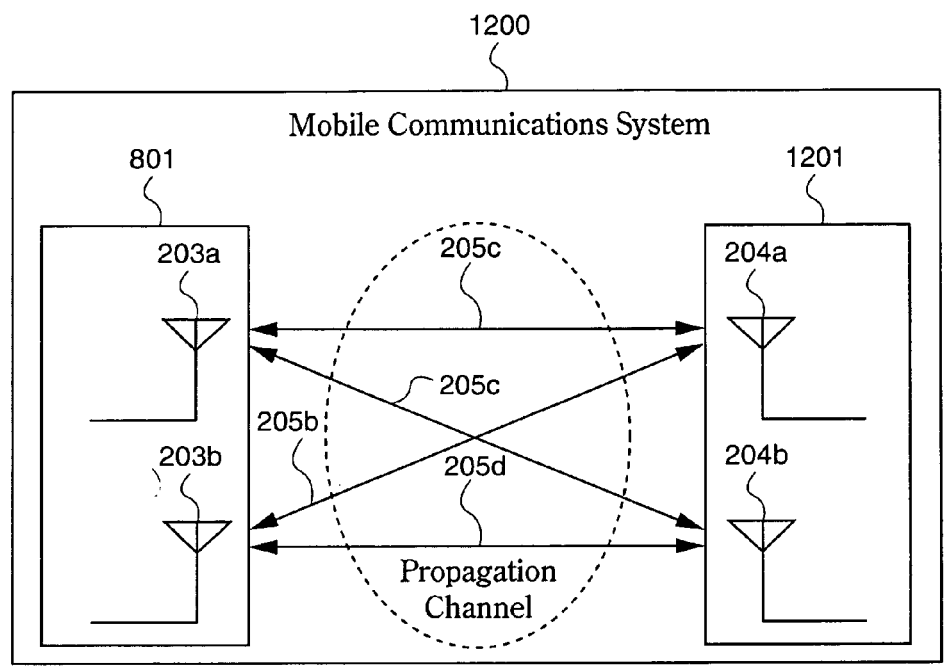
FIG. 12A is a block diagram showing a configuration of a radio communication system according to Embodiment 4 of the present invention.
Figure 12B:
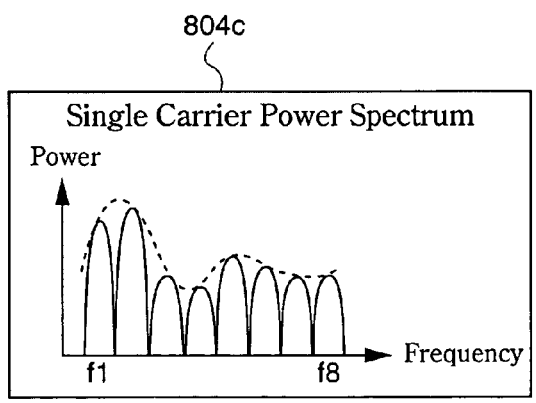
FIGS. 12B and 12C are figures showing a frequency spectrum that configures a propagation channel between a transmitting antenna and a receiving antenna.
Figure 12C:
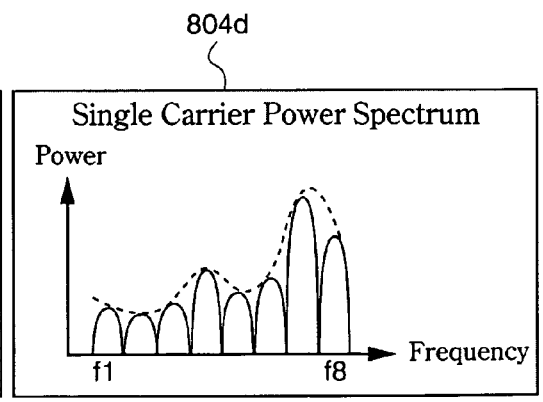

FIG. 12A shows a radio communication system 1200 according to the present Embodiment 4, having virtually the same configuration with Embodiment 3 except that the receiving station 1201 comprises a receiving station antenna 204b in addition to a receiving station antenna 204a. FIG. 12B shows a multiple carriers power spectrum 804c for a propagation channel 205c between a transmitting station antenna 203a and the receiving station antenna 204b. FIG. 12C shows a multiple carriers power spectrum 804d for a propagation channel 205d between a transmitting station antenna 203b and the receiving station antenna 204b. The eight sub-carrier elements 803a to 803h configuring multiple carriers are the same as shown in FIG. 8B.

Figure 13:
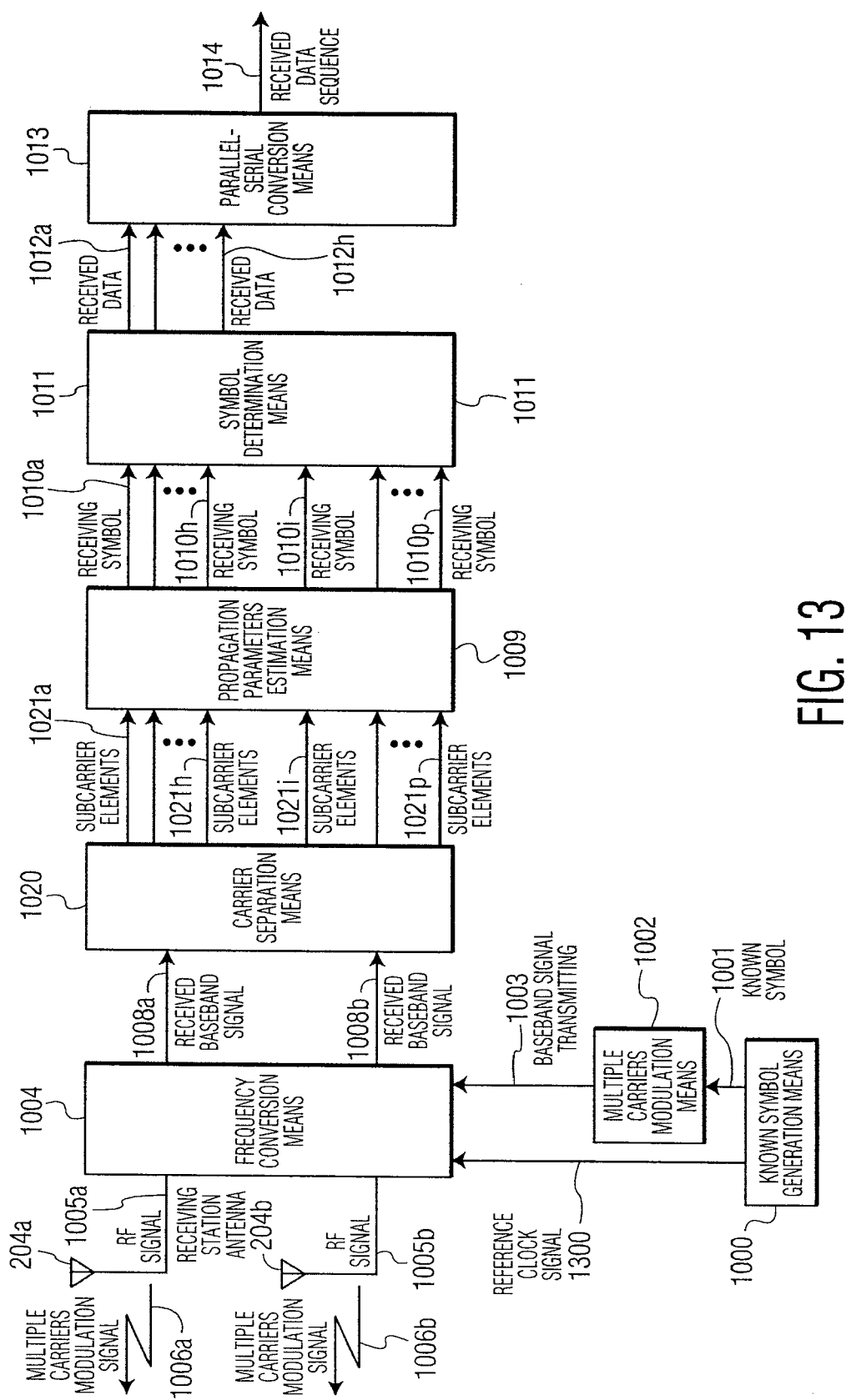
FIG. 13 is a block diagram showing a configuration of a receiving station according to Embodiment 4 of the present invention.
Figure 14:
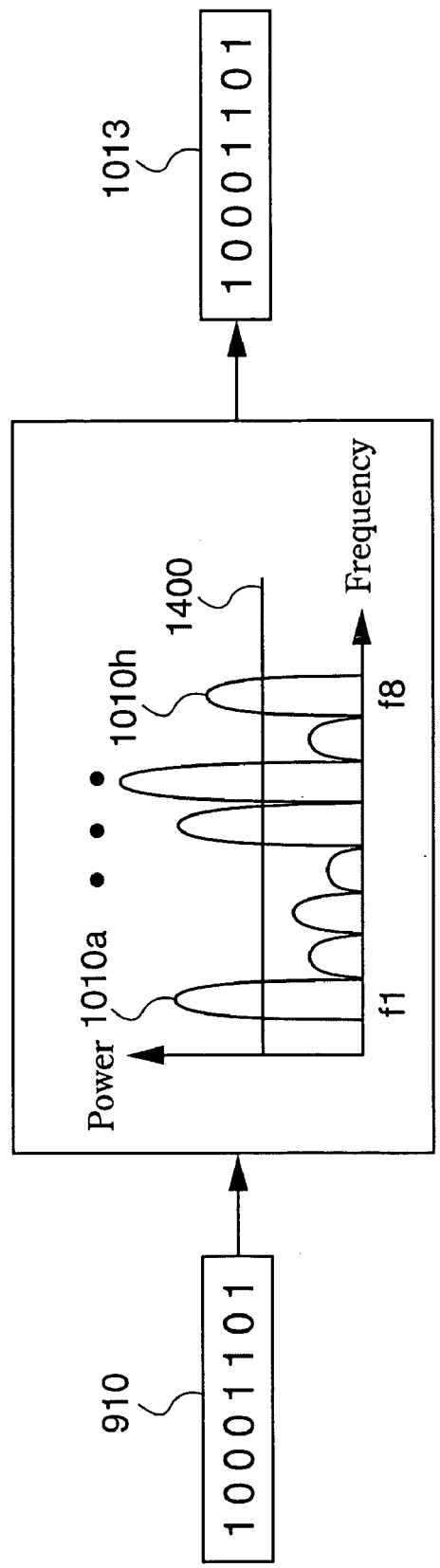
FIG. 14 is a figure showing a way of symbol determination according to Embodiment 3.

FIG. 13 shows a particular configuration of the receiving station 1201. In FIG. 13, a known symbol generation means 1000 is to generate known symbols 1001 for each of the sub-carrier elements 803a to 803h. Multi-carrier modulation signals 1006a and 1006b derived from the known symbols 1001 are transmitting from the receiving station antennas 204a and 204b respectively using the different time slots T1 and T2, just as Embodiment 2. A reference clock signal 1300 for determining the respective time-slot timings are to be generated by the known symbol generation means 1000.

Figure 17:
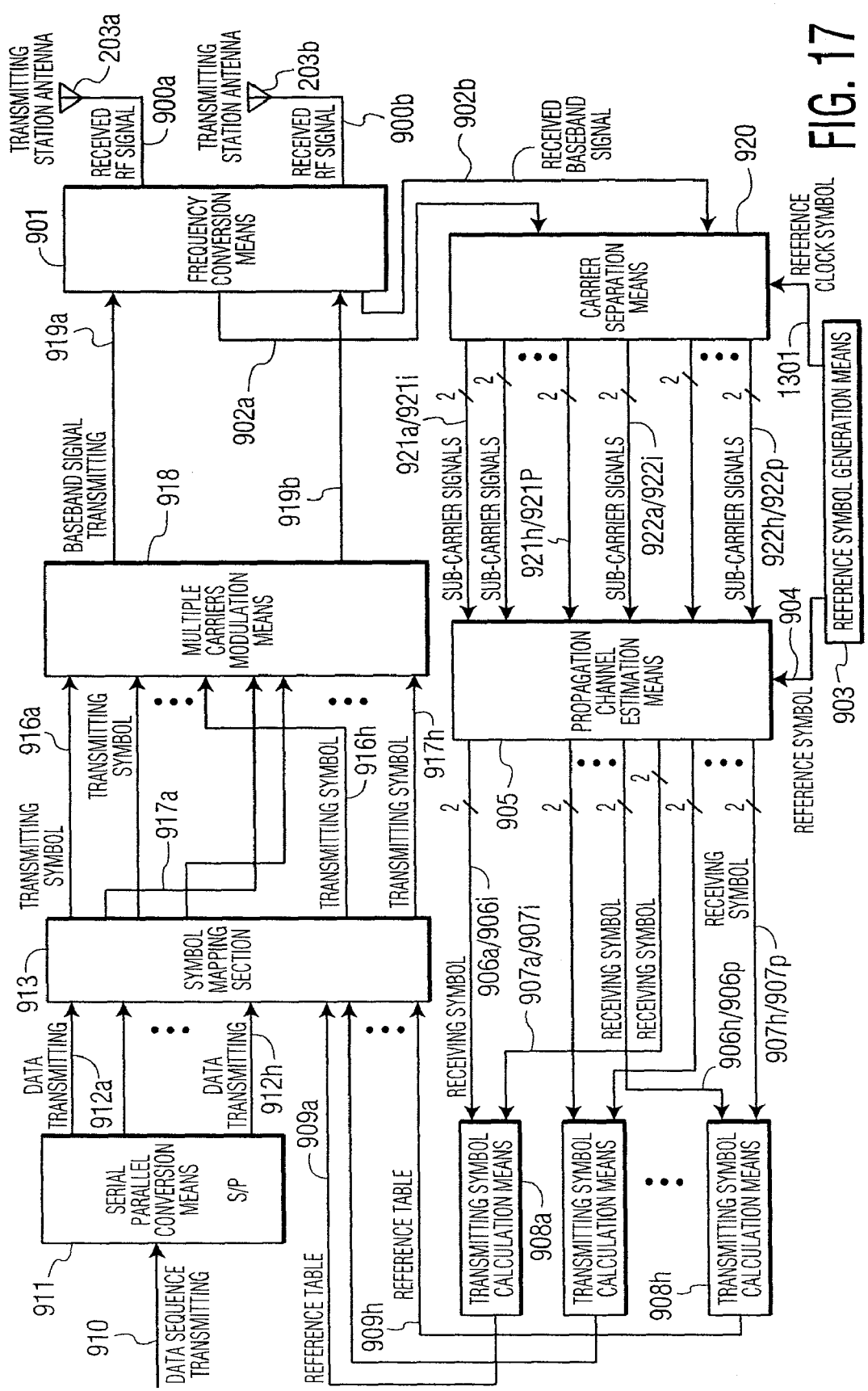
FIG. 17 is a block diagram showing a receiving station according to Embodiment 4 of the present invention.

FIG. 17 is a block diagram showing the configuration of the transmitting station 801 according to the present Embodiment. In FIG. 17, the transmitting station thereof is different from that of Embodiment 3 in that a reference symbol generation means 903 is to generate a reference clock signal 1301 that has a function to determine the timings of time-slots T1 and T2.

In the following examples are demonstrated the radio communication methods, which are performed between the transmitting station 801 and the receiving station 1201 configured as above.

First, in the receiving station 1201, the known symbols 1001 generated by the known symbol generation means 1000 for each of the sub-carrier elements 803a to 803h are modulated to baseband signals transmitting 1003 by a multiple carriers modulation means 1002.

Next, as for the modulated baseband signals 1003, a frequency conversion means 1004 switches between the receiving station antennas 204a and 204b in synchronization with the time slots. By this means, at time slot T1 for example, the RF signal transmitting 1005a is transmitting as a multiple carriers modulation signal 1006a from the receiving station antenna 204a. Meanwhile, at time slot T2, the RF signal transmitting 1005b is transmitting as a multiple carriers modulation signal 1006b from the receiving station antenna 204b in the same manner.

As a next stage in the transmitting station 801, the transmitting station antennas 203a and 203b receive the multiple carriers modulation signals 1006a that are transmitting from the receiving station antenna 204a and the multiple carriers modulation signals 1006b that are transmitting from the receiving station antenna 204b.

Next, a frequency conversion means 901 separates these receiving signals into the multiple carriers modulation signal 1006a and the multiple carriers modulation signal 1006b. And then there are generated received baseband signals 902a and 902b for each of the time slots (T1, T2), wherein the baseband signals 902a correspond to the transmitting station antenna 203a and the baseband signals 902b correspond to the transmitting station antenna 203b. Then, at time slot T1, a carrier separation means 920 separates the received baseband signals 902a and 902b into eight sub-carrier elements 803a to 803h, that is to say, sub-carrier signals 921a to 921h and 922a to 922h respectively by fast Fourier Transform (FFT) process or band-limiting filtering process.

Then, a propagation channel estimation means 905 generates receiving symbols 906a to 906h and receiving symbols 907a to 907h from the sub-carrier signals 921a to 921h and 922a to 922h respectively based on a reference symbol 904, wherein the receiving symbols 906a to 906h are the estimate values for the complex propagation channel between the receiving station antenna 204a and the transmitting station antenna 203a while the receiving symbols 907a to 907h are the estimate values for the complex propagation channel between the receiving station antenna 204a and the transmitting station antenna 203b.

Similarly at time slot T2, the inputted received baseband signals 902a and 902b are respectively separated into eight sub-carrier elements 803a to 803h, that is to say, sub-carrier signals 921i to 921p and 922i to 922p. Then, there are generated receiving symbols 906i to 906p that are the estimate values for the complex propagation channel between the receiving station antenna 204b and the transmitting station antenna 203a, and receiving symbols 907i to 907p that are the estimate values for the complex propagation channel between the receiving station antenna 204b and the transmitting station antenna 203b, based on the reference symbol 904.

Next, transmitting symbol calculation means 908a to 908h process the receiving symbols 906a to 906h and 907a to 907h that are estimated from the receiving signals from the receiving station antenna 204a, and the receiving symbols 906i to 906p and 907i to 907p that are estimated by the receiving signals transmitting from the receiving station antenna 204b. Through that process, one transmitting symbol calculation means (for example, 908a) calculates a plurality of pairs of transmitting symbol vectors, wherein each pair is made of two transmitting symbols corresponding to the transmitting station antennas 203a and 203b respectively. Then there are generated eight reference tables 909a to 909h, each reference table being configured by the a plurality of pairs of transmitting symbol vectors that are calculated for each of the sub-carrier elements 803a to 803h.

As described above, both of the transmitting station 801 and the receiving station 1201 calculate the propagation parameters between them in advance with the known symbols, and store the calculation results as a reference table.

In such situation like this, confidential data transmitting 910 is parallel-converted first by a serial-parallel conversion means 911, being inputted to a symbol mapping section 913.

Then, the symbol mapping section 913 processes the eight separated signals transmitting 912a to 912h with the reference tables, generating the transmitting symbol pairs 916a and 917a, 916b and 917b, . . . to 916h and 917h and the transmitting symbol pairs 916i and 917i, 916j and 917j, . . . to 916p and 917p (sixteen pairs in total) so that the change of powers of the receiving symbols 1010a to 1010h and 1010i to 1010p is equal to the data sequence transmitting 910.

Next, a multiple carriers modulation means 918 processes the transmitting symbols 916a to 916h, 917a to 917h, 916i to 916p, 917i to 917p, thus generating baseband signals transmitting 919a and 919b.

Next, the frequency conversion means 901 converts the baseband signal transmitting 919a into a RF signal transmitting 900a, then transmitting it from the transmitting station antenna 203a to the receiving station 1201. Similarly the frequency conversion means 901 converts the baseband signal transmitting 919b into a RF signal transmitting 900b, then transmitting it from the transmitting station antenna 203b to the receiving station 1201.

Then, in the receiving station 1201, the receiving station antenna 204a synthesizes and receives the RF signal 900a transmitting from the transmitting station antenna 203a in the transmitting station 801 and the RF signal 900b transmitting from the transmitting station antenna 203b thereof, thus generating a RF signal 1005a. The RF signal 1005a is converted into a received baseband signal 1008a by the frequency conversion means 1004.

In the same manner, the receiving station antenna 204b synthesizes and receives the RF signals transmitting 900a and 900b, generating a RF signal 1005b. The RF signal 1005b is then converted into a received baseband signal 1008b by the frequency conversion means 1004.

Next, a carrier separation means 1020 processes the received baseband signal 1008a by Fast Fourier Transform (FFT) or band-limiting filtering process.

After that, a propagation parameter estimation means 1009 separates the baseband signal 1008a into the eight complex sub-carrier elements and detected by orthogonal detection, thus generating receiving symbols 1010a to 1010h. In the same manner, the carrier separation means 1020 processes the received baseband signal 1008b by FFT or by band-limiting filtering process, thus generating eight receiving symbols 1010i to 1010p, which are the complex symbols separated into the eight sub-carrier elements and detected by orthogonal detection.

Next, a symbol determination means 1011 calculates the power differences between the receiving symbols 1010a to 1010h and 1010i to 1010p. Then symbol determination process is performed based on predetermined criteria, thus generating received data 1012a to 1012h.

Finally a parallel-serial conversion means 1013 converts these received data 1012*a* to 1012*h* into a received data sequence 1014 (a serial data sequence), thus reconstructing the transmitting data sequence 910 including confidential information which is transmitting from the transmitting station 801.

Figure 15:
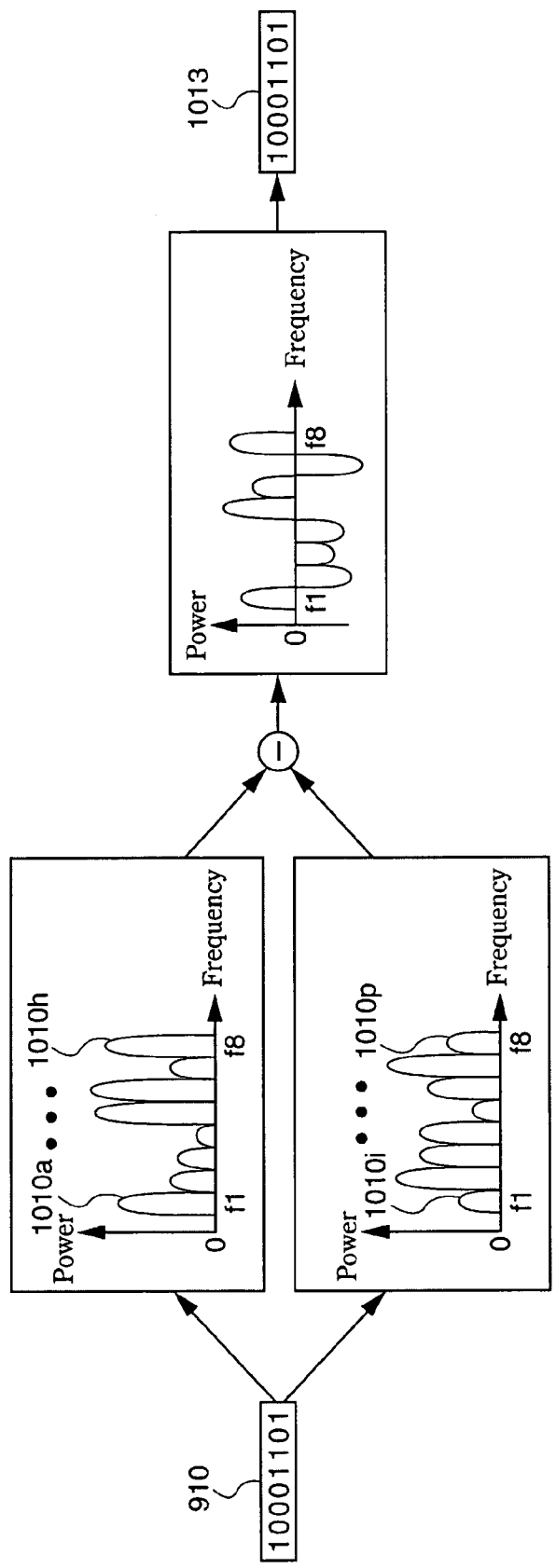
FIG. 15 is a figure showing a way of symbol determination according to Embodiment 4.

FIG. 15 shows the operation of symbol determination, wherein symbol determination is made between '1' or '0' based on a particular symbol-determination-criterion by calculating the power differences between the receiving symbols 1010*a* to 1010*h* and 1010*i* to 1010*p* for each of the sub-carrier elements 803*a* to 803*h* in advance. In FIG. 15, it is determined as '1' when the power difference is positive while it is determined as '0' when the power difference is negative.

Namely, as shown in FIG. 15, in a case where the power of each of the receiving symbols 1010*a* to 1010*h* is higher, the symbol value should be determined as '1' while in a case where the power of each of the receiving symbols 1010*i* to 1010*p* is higher, it should be determined as '0' for each of the sub-carrier elements 803*a* to 803*h*.

As described above, in such a radio communication system where the transmitting data sequence 910 is to be demodulated based on relative receiving power differences between the receiving station antennas 204*a* and 204*b*, if a third party intends to demodulate or reconstruct the transmitting data 910 including confidential information by other receiving stations, it is necessary for the third party to specify all the four propagation channels made between the two antennas of the receiving station 1201 and the two antennas of the transmitting station. As a result of this, it is made possible to transmit confidential information with even higher degree of security.

Incidentally, in the receiving station 1201, the configuration is such that the multiple carriers modulation signals derived from the known symbol 1001 are separately transmitting from the receiving station antennas 204*a* and 204*b* at the different time slots T1 and T2. But it is not limited to this configuration. It is also possible to use mutually-orthogonal known symbols P1 and P2 instead of different time slots, transmitting the known symbol P1 from the receiving station antenna 204*a* and the known symbol P2 from the receiving station antenna 204*b* at the same time slot after performing multiple carriers modulations.

In this case, in the transmitting station 801, the reference symbol generation means 903 is to generate reference symbols R1 and R2, wherein R1 is equal to the known symbol P1 and R2 is equal to the known symbol P2. And then, after the carrier separation means 920 separates the received baseband signals 902*a* and 902*b* into eight sub-carrier elements 803*a* to 803*h* by Fast Fourier Transform (FFT) or band-limiting filtering process, the propagation channel estimation means 905 generates the receiving symbols 906*a* to 906*h* and the receiving symbols 907*a* to 907*h* respectively based on the reference symbol R1, wherein the receiving symbols 906*a* to 906*h* are the estimate values for the complex propagation channel between the receiving station antenna 204*a* and the transmitting station antenna 203*a* while the receiving symbols 907*a* to 907*h* are the estimate values for the complex propagation channel between the receiving station antenna 204*a* and the transmitting station antenna 203*b*. In the same way, the propagation channel estimation means 905, inputting the received baseband signals 902*a* and 902*b*, generates the receiving symbols 906*i* to 906*p* and the receiving symbols 907*i* to 907*p* respectively based on the reference symbol R2, wherein the receiving symbols 906*i* to 906*p* are the estimate values for the complex propagation channel between the receiving station antenna 204*b* and the transmitting station antenna 203*a* while the receiving symbols 907*i* to 907*p* are the estimate values for the complex propagation channel between the receiving station antenna 204*b* and the transmitting station antenna 203*b*.

Incidentally in the above examples are demonstrated the radio system configuration assuming the frequency multiplexing system as represented by OFDM. However, this radio communication system, configured similarly to the present Embodiment, can be also applied to CDMA by corresponding to the sub-carrier elements of OFDM to spread codes of CDMA.

Herein, in the following example is demonstrated the case where CDMA with spread spectrum modulation method is assumed. In this case, spread codes C1 to C8 are to be substituted for the sub-carrier elements 803*a* to 803*h* in the radio communication according to the present Embodiment.

First, in the receiving station 1201, spread spectrum modulation signals, derived from the known symbols 1001 that are corresponding to each of the spread codes C1 to C8, are transmitting from the receiving station antennas 204*a* and 204*b* separately at the different time slots T1 and T2.

Next, the propagation channel estimation means 905 of the transmitting station 801 applies reverse spread process to the received baseband signals 902*a* and 902*b* with eight spread codes C1 to C8 at time slot T1, generating the receiving symbols 906*a* to 906*h* and the receiving symbols 907*a* to 907*h* from the baseband signals 902*a* and 902*b* respectively based on the reference symbol 904, wherein the receiving symbols 906*a* to 906*h* are the estimate values for the complex propagation channel between the receiving station antenna 204*a* and the transmitting station antenna 203*a* while the receiving symbols 907*a* to 907*h* are the estimate values for the complex propagation channel between the receiving station antenna 204*a* and the transmitting station antenna 203*b*. Similarly at time slot T2, the propagation channel estimation means 905 inputs the received baseband signals 902*a* and 902*b* and generates therefrom the receiving symbols 906*i* to 906*p* and the receiving symbols 907*i* to 907*p* based on the reference symbol 904, wherein the receiving symbols 906*i* to 906*p* are the estimate values for the complex propagation channel between the receiving station antenna 204*b* and the transmitting station antenna 203*a* while the receiving symbols 907*i* to 907*p* are the estimate values for the complex propagation channel between the receiving station antenna 204*b* and the transmitting station antenna 203*b*.

Then, the transmitting symbol calculation means 908 calculates a plurality of pairs of transmitting symbol vectors from the receiving symbols 906*a* to 906*h* and 907*a* to 907*h* that are estimated from the receiving station antenna 204*a* and the receiving symbols 906*i* to 906*p* and 907*i* to 907*p* that are estimated from the receiving station antenna 204*b*, wherein each pair (of transmitting symbol vector) consists of two transmitting symbols corresponding respectively to each of the transmitting station antennas 203*a* and 203*b*. In this means are calculated these a plurality of pairs of transmitting symbol vectors for each of the spread codes C1 to C8 (8 times in total), thus generating eight reference tables 909*a* to 909*h* where each one of reference tables consists of the a plurality of pairs of transmitting symbol vectors.

As described above, both the transmitting station 801 and the receiving station 1201 calculate the propagation parameters between them in advance with the known symbols, then storing them as a reference table.

Next, in the same way as the case of aforementioned OFDM, the data transmitting 910 are converted into sets of transmitting symbols with the reference tables, thus being transmitting from the transmitting station antennas 203*a* and 203*b*.

Then, as for the signals received at receiving station 1201 (1202?), the propagation parameter estimation means 1009 applies reverse spread process to the received baseband signal 1008a with the eight spread codes C1 to C8. Through the process, it is separated depending on the eight spread codes C1 to C8 and detected by orthogonal detection, thus generating receiving symbols 1010a to 1010h, which are complex symbols.

In a similar way, reverse spread process is provided to the received baseband signal 1008b with the eight spread codes C1 to C8. And through that process, it is separated depending on the eight spread codes C1 to C8 and detected by orthogonal detection, thus generating receiving symbols 1010i to 1010p, which are complex symbols.

Finally the symbol determination means 1011 reconstructs the transmitting data sequence 910 including confidential information that is transmitting from the transmitting station 801, based on the receiving symbols 1010a to 1010h and the receiving symbols 1010i to 1010p.

In such a radio communication system with CDMA as described above, it is made possible to assure even higher degree of security not only thanks to the confidentiality of spread codes utility but also by utilizing the modulation method based on the random characteristics of propagation parameter.

Incidentally, if the number of antennas set in the receiving station 1201 increases to three or more, more variety can be expected in the antenna set to be used. Consequently it is made much more difficult for a third party to demodulate or reconstruct confidential information by other receiving stations, assuring even higher degree of security.

As described, the radio communication system according to the present invention makes it possible to assure high security in the physical layer of communication. Further, because those processes are basically independent of the conventional arithmetic way of encryption/demodulation and can be used at the same time, it is made possible to expect even higher degree of security by using the present invention in set with the prior arts.

Embodiment 5

Figure 21:
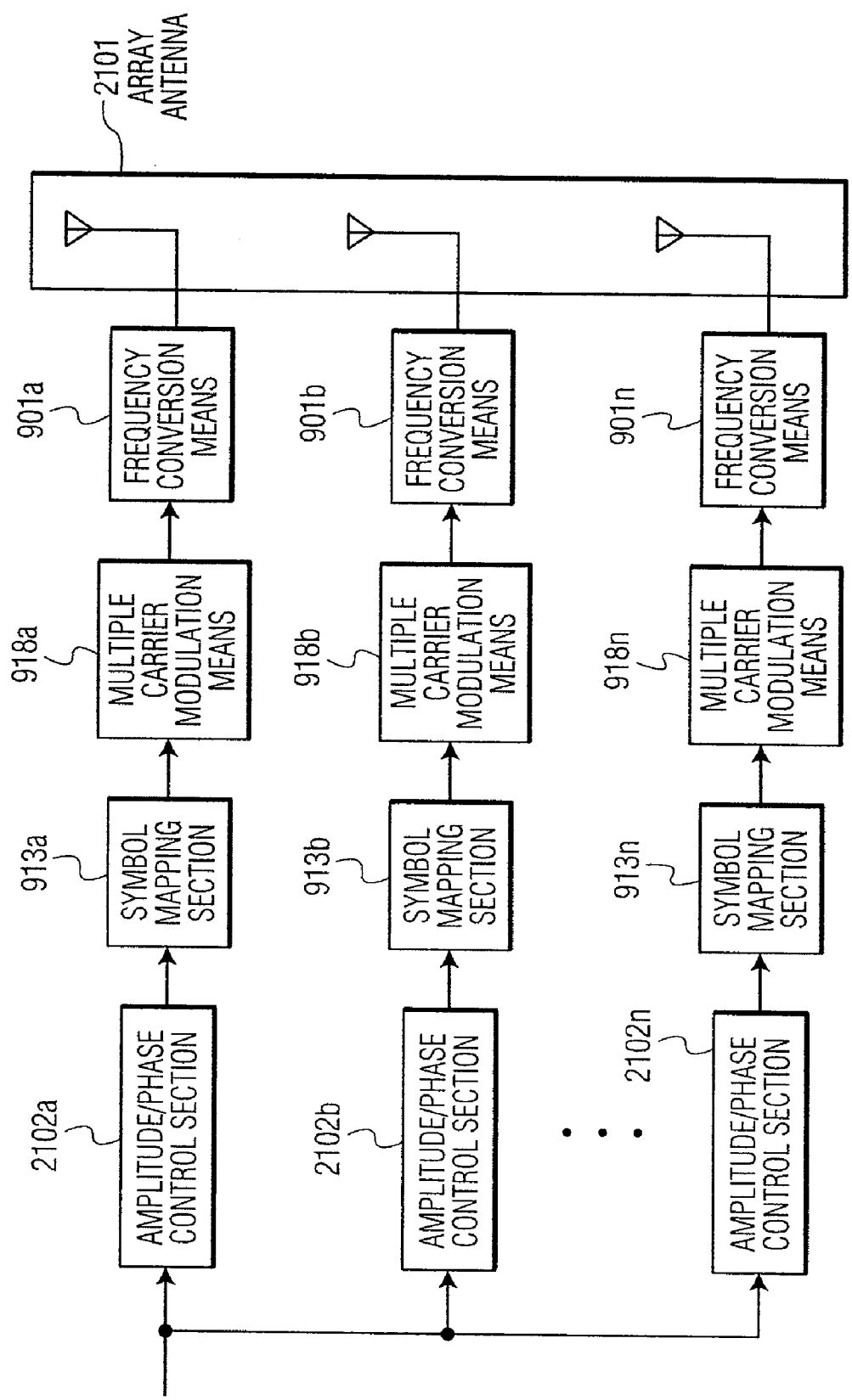
FIG. 21 is a block diagram showing a configuration of a transmitting station according to Embodiment 5 of the present invention.

FIG. 21 is a block diagram showing the configuration of an array-antenna transmitting station according to the present Embodiment. In FIG. 21, amplitude/phase control sections 2102a to 2102n are to control the amplitude and phase from respective antennas to form directional beams. Any other configuration blocks provided in respective branches are the same as those of Embodiment 3. There are not figured the propagation channel estimation means that generates a reference table after receiving known symbols from a receiving station, reference symbol generation means or transmitting symbol calculation means herein, but they are all provided in the respective branches in the same way as Embodiment 3.

Figure 22:
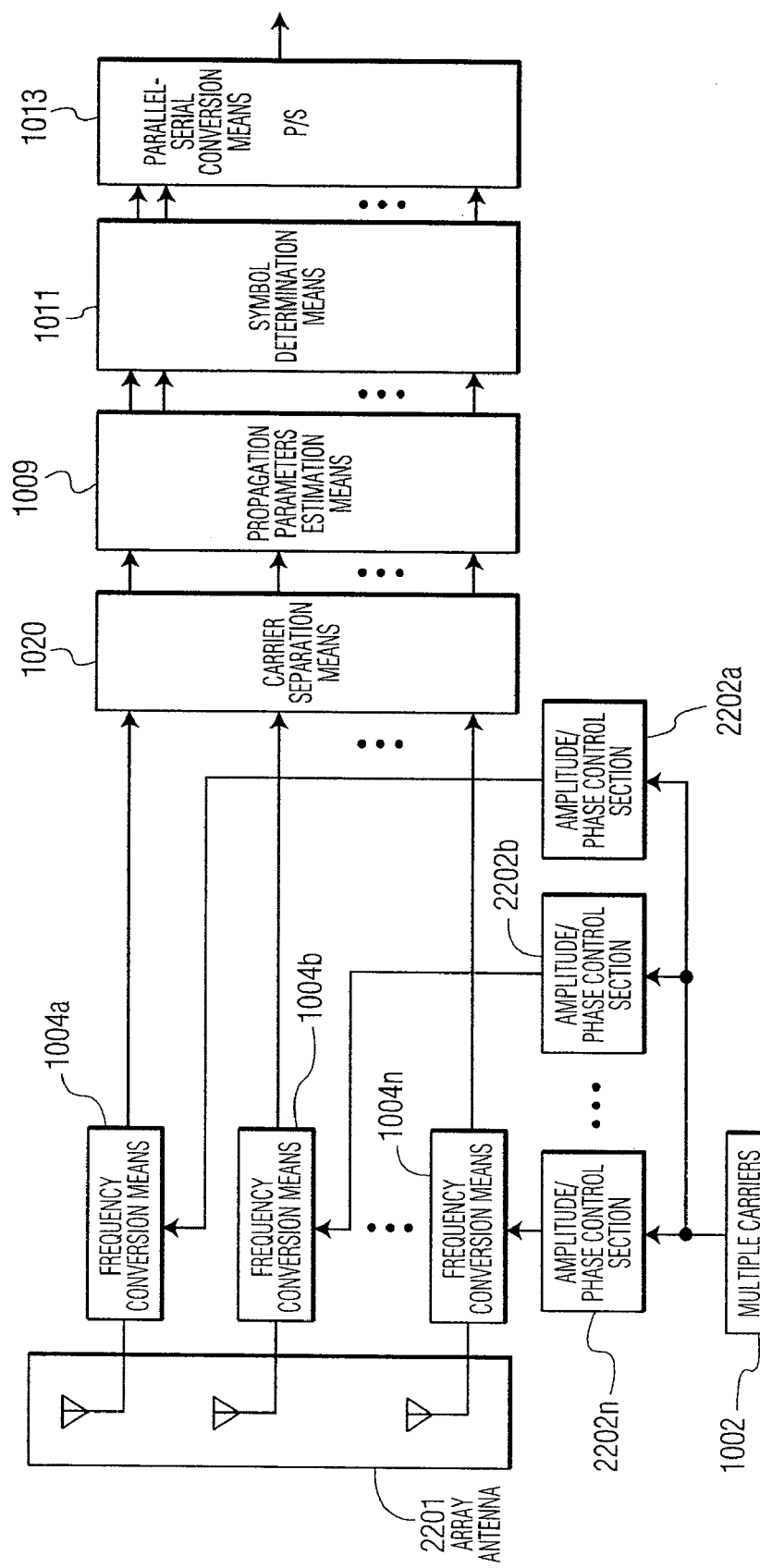
FIG. 22 is a block diagram showing a configuration of a receiving station according to Embodiment 5 of the present invention.
Figure 23:
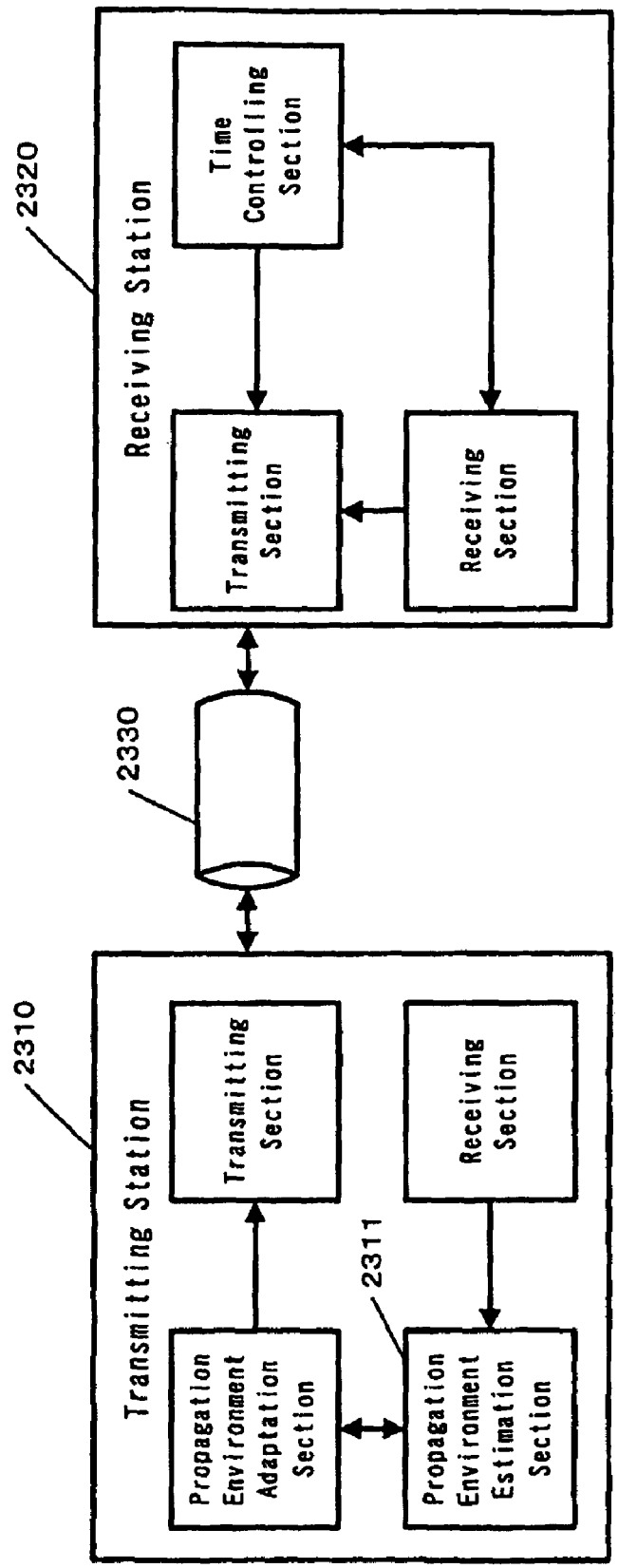
FIG. 23 is a block diagram showing a configuration of a conventional radio communication system.

FIG. 22 is a block diagram showing the configuration of an array antenna receiving station according to the present Embodiment. In FIG. 22, it is different from Embodiment 3 in that the symbols generated by the known symbol generation means 1000 are, after modulated by the multiple carriers modulation means 1002, to be generated as directional beams by the respective amplitude/phase control sections 2202a to 2202n for each of the array antennas. Any other configuration blocks are the same as that of Embodiment 3.

By that configuration as described above, the transmitting station can control the receiving power of the antennas in the receiving station 802 by generating a plurality of directional beams and appropriately combining those beams.

Such control can be realized because, in a situation where the propagation parameter is deemed to be fixed, the power or phase differences of the arrival paths at the side of a receiving antenna will vary in accordance with the change of directional pattern at the side of a transmitting antenna.

Meanwhile, other than array antennas, it is possible for the transmitting station 801 to transmit a bit information transmitting by controlling the position of the single carrier elements one-by-one on the frequency-axis, wherein the single carrier element is to be detected from the multiple carriers receiving signal in the receiving station 1201.

To be more precise, the transmitting station controls the transmitting antennas one-by-one for changing the directional patterns thereof based on the propagation parameter particularly shared between the transmitting station and the receiving station. By this means is controlled the receiving power of each of the single carrier elements at the receiving antennas.

In this case, each position of the respective single-carriers on the frequency-axis (these sing-carriers in total configure a multiple carriers signal received at the receiving station) is to correspond to the bit-information-to-be-transmitting respectively. For example, if a multiple carriers transmitting signal comprises eight single carriers, it is made in advance that each 3-bit information transmitting "000" to "111" should correspond to each of the single carriers f1 to f8 respectively on the frequency-axis. When the bit information transmitting is "010", the transmitting station changes the directional patterns of the transmitting antennas for controlling the single carrier f3 in the receiving station so that it can receive the maximum powered signal as compared with other single carrier elements. Then the receiving station calculates the frequency spectrum for the receiving signal and if it is estimated that the power of the single carrier f3 is the maximum, now the bit information transmitting can be determined as "010".

Further, in a way where the receiving station determines bit-information-to-be-transmitting based on the results obtained by carrier detection, the transmitting station will control the transmitting power of each single carrier, for example, where a plurality of single carriers configure a multiple carriers. In this way there is occurred neither big drop in the receiving power under the multi-path fading environment nor a bit-error. Also a third party can hardly estimate the bit-information-to-be-transmitting by other radio stations.

Namely, according to the present invention, the transmitting station can change the transmitting antennas' directional patterns based on the propagation parameter particularly shared between the transmitting station and the receiving station, thus controlling the receiving power of each of the single carriers in the receiving antennas. In addition, bit error caused by multi-path fading can be compensated for. And furthermore, it is made possible to prevent the transmitting information from being leaked to a third party that is characterized by a different propagation parameter.

INDUSTRIAL APPLICABILITY

As described above, the present invention is useful for a communication method where a broadband radio communication is performed between particular radio stations, being applicable for transmitting confidential information with high security.

LIST OF DRAWING REFERENCE NUMBERS

100 mobile communication system
200,600,800,1200 radio communication system 101 transmitting antenna
102a,102b receiving antenna
103a,103b,205a,205b,205c,205d propagation channel
104a,104b frequency spectrum
201,801 transmitting station
202,601,802,1201 receiving station
203a,203b transmitting station antenna
204a,204b receiving station antenna
206a,206b,206c,206d single-carrier power spectrum
300a,300b,407a,407b,900a,900b,1007a,1007b received RF signal
301,404,901,1004 frequency conversion means
302a,302b,408a,408b,902a,902b,1008a,1008b received baseband signal
303,903 reference symbol generation means
304,904 reference symbol
305,905 propagation channel estimation means
306,307,410a,410b,906a-906p,907a-907p,1010a-1010h receiving symbol
308, 908a-908h transmitting symbol calculation means
309,909a-909h reference table
310,912a-912h data transmitting
311,913 symbol mapping section
312,914a-914h table memory means
313,915a-915h symbol selection means
314,315,916a-916h,917a-917h transmitting symbol
316,402 single carrier modulation means
317a,317b,403,919a,919b,1003 baseband signal transmitting
318a, 318b, 4041 920a, 920b, 1005 RF signal
400,1000 known symbol generation means
401,1001 known symbol
402 single carrier modulation means
406a,406b single carrier modulation signal
409,1009 propagation parameters estimation means
411,1011 symbol determination means
412,1012a-1012h received data
700,701,1300,1301 reference clock signal
803a-803h sub-carrier element
804a,804b,804c,804d multiple carriers power spectrum
910 data sequence transmitting
911 serial-parallel conversion means
918,1002 multiple carriers modulation means
920 carrier separation means
1006a,1006b multiple carriers modulation signal
1013 parallel-serial conversion means
1014 received data sequence
1400 particular power threshold
1020 carrier separation means
2102a-2102n,2202a-2202n amplitude/phase control section
2101,2201 array antenna
2310 transmitting station
2311 propagation environment estimator
2320 receiving station
2330 radio propagation channel

The invention claimed is:

1. A transmitting apparatus for transmitting data to a radio station, the apparatus comprising:

an array antenna including M, pieces of antenna elements for receiving a carrier modulation signal of a known symbol that is transmitting from a radio station and for transmitting a signal to the radio station, where M is an integer of 2 or more;

a frequency conversion means for converting the carrier modulation signal into a baseband signal;

a reference symbol generation means for generating a reference symbol that gives a phase reference and is the same symbol with the known symbol;

a propagation channel estimation means for generating receiving symbols from the baseband signal based on the reference symbol, wherein the receiving symbols are estimate values for a complex propagation channel between a transmitting antenna of the radio station and the array antenna;

a transmitting symbol calculation means for calculating plural sets of transmitting symbol vectors from the receiving symbols so that each transmitting symbol vector is configured by plural sets of transmitting symbols and then generating a reference table configured by the plural sets of transmitting symbol vectors;

a symbol mapping means for generating transmitting symbols by selecting one set of the transmitting symbol vector from the reference table based on transmitting data;

a carrier modulation means for generating baseband signals from the transmitting symbols;

a transmitting means for converting baseband signals to radio frequency signals to transmit the radio frequency signals to the radio station through the array antenna; and a carrier separation means for separating the baseband signal received at the M pieces of antenna elements into N pieces of sub-carriers, where N is an integer of 2 or more, wherein the carrier modulation signal is configured by multiple carriers, and said carrier separation means, after separating the received baseband signal into N pieces of sub-carriers, generates "M×N" pieces of receiving symbols that are estimate values of a complex propagation channel based on the reference symbol, where N is an integer of 2 or more.

2. The transmitting apparatus according to claim 1, wherein
the M pieces of antenna elements configuring said array antenna have a mutually-different directional pattern, or mutually-different polarization.

3. The transmitting apparatus according to claim 1, wherein
a transmitting symbol calculation means calculates plural sets of transmitting symbol vectors from the "M×N" pieces of receiving symbols for each of N pieces of sub-carriers so that each vector is configured by M pieces of transmitting symbols and then generating reference tables configured by the plural sets of transmitting symbols vector, a symbol mapping means generates "M×N" pieces of transmitting symbols by selecting one set of transmitting symbol vector from each of N pieces of reference tables that correspond to the N pieces of sub-carriers based on transmitting data and a single carrier modulation means generates transmitting baseband signals from "M×N" pieces of transmitting symbols with N pieces of sub-carrier elements.

4. A transmitting apparatus for transmitting data to a radio station, the apparatus comprising:

an array antenna including M, pieces of antenna elements for receiving a carrier modulation signal of a known symbol that is transmitting from a radio station and for transmitting a signal to the radio station, where M is an integer of 2 or more;

frequency conversion means for converting the carrier modulation signal into a baseband signal;

reference symbol generation means for generating a reference symbol that gives a phase reference and is the same symbol with the known symbol;

propagation channel estimation means for generating receiving symbols from a baseband signal received at the antenna elements based on the reference symbol, wherein the receiving symbols are estimate values for a complex propagation channel between a transmitting antenna of the radio station and the array antenna, wherein said propagation channel estimation means, after applying a reverse spread separation process to the baseband signal received at the M pieces of antenna elements with N pieces of spread codes, generates "M×N" pieces of receiving symbols that are estimate values of a complex propagation channel based on the reference symbol, where N is an integer of 2 or more;

transmitting symbol calculation means for calculating plural sets of transmitting symbol vectors from the receiving symbols so that each transmitting symbol vector is configured by plural sets of transmitting symbols and then generating a reference table configured by the plural sets of transmitting symbol vectors, wherein the transmitting symbol calculation means calculates plural sets of transmitting symbol vectors from "M×N" pieces of receiving symbols for each of N pieces of spread codes so that each transmitting symbol vector is configured by M pieces of transmitting symbols and then generating reference tables configured by the plural sets of transmitting symbol vectors;

symbol mapping means for generating transmitting symbols by selecting one set of the transmitting symbol vector from the reference table based on transmitting data, wherein the symbol mapping means generates "M×N" pieces of transmitting symbols by selecting one set of transmitting symbol vector from each of the N pieces of reference tables that correspond to the N pieces of spread codes respectively, based on transmitting data including confidential information;

a carrier modulation means for generating baseband signals from the transmitting symbols, wherein the carrier modulation means generates transmitting baseband signals from the "M×N" pieces of transmitting symbols by spread process with N pieces of reverse spread codes; and a transmitting means for converting baseband signals to radio frequency signals to transmit the radio frequency signals to the radio station through the array antenna.

5. The transmitting apparatus according to claim 3, wherein:
said transmitting symbol calculation means generates the plural sets of symbol vectors in order to control any one of receiving power and phase of the radio station.

6. The transmitting apparatus according to claim 4, wherein:
said transmitting symbol calculation means generates the plural sets of symbol vectors in order to control any one of receiving power/phase of the radio station.

7. A radio communication method of transmitting data on a single carrier from a first radio station to a second radio station, comprising the steps of:
transmitting information known by both radio stations from the second radio station to the first radio station;
estimating a propagation parameter, which is a parameter of a propagation channel shared only between the first radio station and the second radio station, based on the known information and received information transmitted from the second radio station by the first radio station;
transmitting data from the first radio station to the second radio station by superimposing the transmitting data including a confidential information on the estimated propagation parameter;
calculating a plurality of propagation parameters that are obtained from receiving signals of a plurality of antennas in the second radio station; and
reconstructing the transmitting data based on a plurality of propagation parameters calculated by the second radio station, wherein
said step of estimating a propagation parameter includes the steps of
generating a receiving symbol from the information transmitted from the second radio station,
calculating plural sets of transmitting symbol vectors from the receiving symbols so that each transmitting symbol vector is configured by plural sets of transmitting symbols and then generating a reference table configured by the plural sets of transmitting symbol vectors, wherein the plural sets of transmitting symbol vectors is for controlling any one of receiving power and phase of the radio station; and
transmitting symbols by selecting one set of the transmitting symbol vector from the reference table based on transmitting data.

8. A radio communication method of transmitting data on a multiple carriers from a first radio station to a second radio station, comprising the steps of:
transmitting information known by both radio stations from the second radio station to the first radio station;
estimating a propagation parameter, which is a parameter of a propagation channel shared only between the first radio station and the second radio stations, based on the known information and received information transmitted from the second radio station by the first radio station;
transmitting data from the first radio station to the second radio station by superimposing the transmitting data on the estimated propagation parameter;
calculating a plurality of propagation parameters obtained from receiving signals of a plurality of antennas in the second radio station; and
reconstructing the transmitting data based on the a plurality of propagation parameters calculated in the second radio station,
wherein said step of estimating a propagation parameter includes the steps of
generating a receiving symbol from the information transmitted from the second radio station,
calculating plural sets of transmitting symbol vectors from the receiving symbols so that each transmitting symbol vector is configured by plural sets of transmitting symbols and then generating a reference table configured by the plural sets of transmitting symbol vectors, wherein the plural sets of transmitting symbol vectors is for controlling any one of receiving power and phase of the radio station; and
transmitting symbols by selecting one set of the transmitting symbol vector from the reference table based on transmitting data.

9. The radio communication method according to claim 8, wherein the second radio station reconstructs the transmitting data based on the propagation parameter estimated from the receiving signal for each carrier configuring the multiple carriers.

10. The radio communication method according to claim 9, wherein each carrier configuring the multiple carriers is any one of a OFDM signal that is so configured as to be mutually-orthogonal in a frequency space and a CDMA signal that is so configured as to be mutually-orthogonal in a code space.

11. A radio communication system of transmitting data by a single carrier modulation method from a first radio station to a second radio station, comprising:

the first radio station comprising;

a propagation channel estimation means for estimating a propagation channel parameter including receiving symbols shared only between the first radio station and the second radio station, when the first radio station transmits data including confidential information to a second radio station;

a transmitting symbol calculation means for calculating plural sets of transmitting symbol vectors from the receiving symbols so that each transmitting symbol vector is configured by plural sets of transmitting symbols and then generating a reference table configured by the plural sets of transmitting symbol vectors, the plural sets of transmitting symbol vectors being for controlling any one of the receiving power and phase of the radio station;

a symbol mapping means for generating transmitting symbols by selecting one set of the transmitting symbol vector from the reference table based on transmitting data; and a transmitting means for generating a carrier modulation signal from the transmitting symbols and transmitting a signal including information of the transmitting data from the first radio station to the second radio station, and the second radio station comprising;

a propagation parameter estimation means for calculating a plurality of propagation parameters obtained from receiving signals of a plurality of antennas; and a symbol determination means for reconstructing transmitting data from the first radio station based on a plurality of the calculated propagation parameters, wherein the data transmitting from the first radio station to the second radio station includes confidential information.

* * * * *

UNITED STATES PATENT AND TRADEMARK OFFICE
CERTIFICATE OF CORRECTION

PATENT NO. : 7,720,172 B2 Page 1 of 1
APPLICATION NO. : 10/520028
DATED : May 18, 2010
INVENTOR(S) : Yoichi Nakagawa et al.

It is certified that error appears in the above-identified patent and that said Letters Patent is hereby corrected as shown below:

On the Title Page item [54], and column 1, line 1: Title, "TRANSMITTING APPARATUS RECEIVING APPARATUS, RADIO COMMUNICATION METHOD AND RADIO COMMUNICATION SYSTEM" should read --TRANSMITTING APPARATUS, RECEIVING APPARATUS, RADIO COMMUNICATION METHOD AND RADIO COMMUNICATION SYSTEM--

Signed and Sealed this

Seventh Day of December, 2010

David J. Kappos
*Director of the United States Patent and Trademark Office*